(12) United States Patent
Abu Qahouq et al.

(10) Patent No.: US 11,628,731 B2
(45) Date of Patent: Apr. 18, 2023

(54) ENERGY STORAGE AND DELIVERY SYSTEM AND ELECTRIFIED VEHICLE ARCHITECTURES WITH MULTI-MODE CONTROLS

(71) Applicants: The Board of Trustees of The University of Alabama, Tuscaloosa, AL (US); JAQ Energy LLC, Tuscaloosa, AL (US)

(72) Inventors: Jaber A. Abu Qahouq, Tuscaloosa, AL (US); Amer Abu Qahouq, Tuscaloosa, AL (US)

(73) Assignees: The Board of Trustees of The University of Alabama, Tuscaloosa, AL (US); JAQ Energy LLC, Tuscaloosa, AL (US)

( * ) Notice: Subject to any disclaimer, the term of this patent is extended or adjusted under 35 U.S.C. 154(b) by 206 days.

(21) Appl. No.: 17/075,077

(22) Filed: Oct. 20, 2020

(65) Prior Publication Data
US 2021/0188101 A1 Jun. 24, 2021

Related U.S. Application Data

(60) Provisional application No. 62/951,534, filed on Dec. 20, 2019.

(51) Int. Cl.
*B60L 50/00* (2019.01)
*B60L 50/64* (2019.01)
*B60L 53/80* (2019.01)
*B60L 53/57* (2019.01)
*B60K 1/04* (2019.01)
(Continued)

(52) U.S. Cl.
CPC ............ *B60L 50/64* (2019.02); *B60K 1/04* (2013.01); *B60L 53/16* (2019.02); *B60L 53/53* (2019.02); *B60L 53/57* (2019.02); *B60L 53/66* (2019.02); *B60L 53/80* (2019.02); *B60L 58/12* (2019.02); *H01M 50/20* (2021.01); *H02J 7/00041* (2020.01); *B60K 2001/0438* (2013.01); *B60K 2001/0455* (2013.01);
(Continued)

(58) Field of Classification Search
CPC .......... B60L 50/64; B60L 53/57; B60L 53/53; B60L 58/12; B60L 53/80; B60K 1/04; B60K 2001/0438; H02J 9/061; H02J 50/001
See application file for complete search history.

(56) References Cited

U.S. PATENT DOCUMENTS 8,820,444 B2 * 9/2014 Nguyen .................. B60L 53/80
180/65.29
10,217,160 B2 * 2/2019 Penilla .................... B60L 58/20
(Continued)

FOREIGN PATENT DOCUMENTS

WO 2017/210170 12/2017

*Primary Examiner* — Hau V Phan
(74) *Attorney, Agent, or Firm* — Meunier Carlin & Curfman LLC

(57) ABSTRACT

The exemplified systems and methods provide fixed and exchangeable energy storage and delivery system in an electrified vehicle architecture with multi-mode controls. The exchangeable energy storage are configured to be optional and ultra-portable. The integration of fixed and exchangeable energy storage provides a vehicle configuration that is further optimized for size, weight, and convenience.

18 Claims, 24 Drawing Sheets

(51) Int. Cl.
  *B60L 53/16* (2019.01)
  *B60L 53/66* (2019.01)
  *H02J 7/00* (2006.01)
  *B60L 58/12* (2019.01)
  *B60L 53/53* (2019.01)
  *H01M 50/20* (2021.01)

(52) U.S. Cl.
  CPC ... *B60L 2240/425* (2013.01); *B60L 2240/427* (2013.01); *B60L 2240/429* (2013.01); *H01M 2220/20* (2013.01)

(56) References Cited

U.S. PATENT DOCUMENTS

| | | | | |
|---|---|---|---|---|
| 10,474,984 | B2* | 11/2019 | Efird | G06Q 10/0835 |
| 2009/0067208 | A1* | 3/2009 | Martin | H02J 50/001 |
| | | | | 363/126 |
| 2011/0127954 | A1* | 6/2011 | Walley | H02J 50/20 |
| | | | | 320/108 |
| 2016/0077503 | A1* | 3/2016 | Carter | G05B 19/042 |
| | | | | 700/19 |
| 2016/0303990 | A1* | 10/2016 | Penilla | G06F 3/0488 |
| 2018/0118174 | A1* | 5/2018 | Moskowitz | B60L 50/66 |
| 2019/0202416 | A1* | 7/2019 | Lai | G01R 31/382 |
| 2019/0299942 | A1* | 10/2019 | Shih | H02J 9/061 |

* cited by examiner

Mode 4 – Option X:
External charging of all modules

Mode 1

Mode 4-Y

Locked

Unlocked door without
slide-down mechanism

Slide up to Close    Slide Down to Swap/Exchange
Unlocked door with
slide-down mechanism

ENERGY STORAGE AND DELIVERY SYSTEM AND ELECTRIFIED VEHICLE ARCHITECTURES WITH MULTI-MODE CONTROLS

RELATED APPLICATION

This application claims priority to, and the benefit of, U.S. Provisional Patent Application No. 62/951,534, filed Dec. 20, 2019, entitled "Energy Storage and Delivery System and Electrified Vehicle Architectures with Multi-Mode Controls," which is incorporated by reference herein in its entirety.

GOVERNMENT LICENSED RIGHTS

This invention was made with government support under Grant No. 1843319 awarded by the National Science Foundation. The government has certain rights in the invention.

BACKGROUND

Though electric vehicles (EVs) and plug-in hybrid vehicles that do not use, or partially use, conventional fossil fuels are commercially available today, many challenges still prevent them from mass acceptance and wide-spread use. Insufficient charger availability as well as charging-related downtime can contribute to the hesitancy of new potential owners in adopting this technology. EVs battery packs cannot be filled (charged) as fast as a conventional fossil fuel vehicle tank. In certain vehicles, for example, eight hours of charge may be required to drive a full-size EV for three hours. In addition, initial upfront cost of such vehicles may serve as another barrier to the adoption of this technology. With existing commercial electrical vehicles, buyers may also have to decide the size of battery packs and the range of the vehicle while not quite aware of the vehicle's use. Such decision can affect cost as well as overall vehicle efficiency, among other factors.

Existing fast charging technologies may ameliorate some of the issues, for example, those associated with charging-related downtime. Such fast charging technology system however does not address all the above issues and may additionally negatively impact battery performance and life of the batteries of such system. Whole/complete battery swapping, for example, has been proposed decades ago, but is generally deemed to be impractical: (1) it requiring complex electrical (and mechanical) connections (e.g. for power, sensing, and data) between the battery pack and the vehicle, (2) the associated weight of the battery pack being too high, (3) there being safety concerns with battery pack handling, and (4) it requiring skilled technicians to perform the battery pack swapping. Conventional battery swapping similarly also entails use of heavy electrical and mechanical connections that require skilled technicians to operate and consumes time for the technicians to perform such swap. Supercapacitors can be charged faster but cannot retain energy for a duration time that a battery can hold.

SUMMARY

The exemplified systems and methods provide fixed and exchangeable energy storage and delivery system in an electrified vehicle architecture with multi-mode controls. The exchangeable energy storage are configured to be optional and ultra-portable. The integration of fixed and exchangeable energy storage provides a vehicle configuration that is further optimized for size, weight, and convenience.

In an aspect, an energy storage system is disclosed of a vehicle system (or another system). The energy storage system includes a fixed energy storage module configured to provide power to at least a drive system comprising one or more electrical motors or other type of load(s), wherein the fixed energy storage module is suitably sized in power output to solely and independently drive at least the drive system (it is also configured to received energy from exchangeable modules in addition to a charging port); a set of exchangeable energy storage modules configured to provide power to at least the drive system, wherein the set of exchangeable energy storage modules is suitably sized in power output to solely and independently drive at least the drive system; and a multi-mode controller, the multi-mode controller having a processor and memory having instructions stored thereon, wherein execution of the instructions by the processor, cause the processor to control the direction, amount, and/or rate/speed of energy flow from at least one exchangeable energy storage module of the set of exchangeable energy storage modules to the drive system in a first mode; determine when the at least one exchangeable energy storage module has a discharge rate corresponding to a maximum allowable discharge rate for the at least one exchangeable energy storage module when directing energy flow to the drive system; determine available power associated with the energy flow of the at least one exchangeable energy storage module as the at least one exchangeable energy storage module directs energy flow to the drive system; control the direction, amount, and/or rate/speed of energy flow from the fixed energy storage module to the drive system in a second mode based on the determination that the at least one exchangeable energy storage module has a discharge rate corresponding to a maximum allowable discharge rate for the at least one exchangeable energy storage module; and control the direction, amount, and/or rate/speed of energy flow from the at least one exchangeable energy storage to the fixed energy storage module in a third mode (e.g., a Charge-While-Drive mode) based on the determined available power associated with the energy flow of the at least one exchangeable energy storage. Other modes can also include exchanging energy between one or more exchangeable module and one or more exchangeable modules, and between one or more exchangeable module and an external load through an external port.

As used herein, the term "vehicle system" may refer to any land-based, air-based, water-based, building-based, or space-based system that can transport a person and/or cargo. Examples of land-based systems includes, but are not limited to, electric or partially-electric cars, buses, vans, trucks, and/or motorcycles. Electric vehicles are used interchangeably with the term "fully electric vehicles," which refer a class of vehicle having a propulsion or drive system that run solely from energy stored in an electrical form. Partially-electric refers to a class of vehicle having two or more propulsion or drive systems in which one of the drive system runs solely from energy stored in an electric form while the other type of drive system runs on another energy source (e.g., a gasoline or diesel engine).

In some embodiments, the vehicle system includes a fixed energy storage module bay, the fixed energy storage module bay being configured to fixably retain the fixed energy storage module; and a plurality of exchangeable energy storage module bays, each of the plurality of exchangeable energy storage module bays being configured to receive a given exchangeable energy storage module and to adjust between a retaining state and a release state for the given exchangeable energy storage module.

In some embodiments, each of plurality of exchangeable energy storage module bays is configured with a quick-disconnect wire connector to electrically connect to energy storage device (e.g., batteries and/or supercapacitors/ultracapacitors) and electronics of the given exchangeable energy storage module.

In some embodiments, each of plurality of exchangeable energy storage module bays is configured with a quick insertion and removal to wirelessly connect via wireless power transfer to energy storage device (e.g., batteries and/or supercapacitors/ultracapacitors) and electronics of the given exchangeable energy storage module.

In some embodiments, the fixed energy storage module bay is configured with a quick-disconnect wire connector to electrically connect to energy storage device (e.g., batteries and/or supercapacitors/ultracapacitors) and electronics of the fixed energy storage module.

In some embodiments, the fixed energy storage module bay is configured with a quick insertion and removal to wirelessly connect via wireless power transfer to batteries and electronics of the fixed energy storage module.

In some embodiments, the fixed energy storage module comprises a set of sub-modules, each sub-module being housed in a distinct housing to be received in sub-bays located in the fixed energy storage module bay.

In some embodiments, execution of the instructions by the processor, further cause the processor to determine energy storage system is electrically or wirelessly connected to a power source and direct charging and discharging of the fixed energy storage module and the set of exchangeable energy storage modules based on the determination.

In some embodiments, execution of the instructions by the processor, further cause the processor to determine one or more charge-while-drive parameters selected from the group consisting of a maximum power, current, and/or voltage parameter(s) that each exchangeable energy storage module can be discharged with/at; a maximum power, current, and/or voltage parameter(s) that each fixed energy storage module can be discharged with/at; a maximum power, current, and/or voltage parameter(s) that each fixed energy storage module can be charged with/at; a maximum power, current, and/or voltage parameter(s) that each exchangeable energy storage module can be charged with/at; an efficiency parameter associated with an energy transfer between the at least one exchangeable energy storage module and/or the fixed energy storage module; a temperature parameter associated with the at least one exchangeable energy storage module and/or the fixed energy storage module; a state of charge parameter associated with the at least one exchangeable energy storage module and/or the fixed energy storage module; a state of health parameter associated with the at least one exchangeable energy storage module and/or the fixed energy storage module; and a user selection of the charge-while-drive configuration. The instructions can cause the processor to adjust the direction, amount and rate/speed of energy flow from the at least one exchangeable energy storage to the fixed energy storage module based on the determined one or more charge-while-drive parameters.

In some embodiments, each exchangeable energy storage module of the set of exchangeable energy storage modules has a weight that allows for ease of removal an insertion without the need for complex tools or equipment.

In another aspect, an electric vehicle or hybrid-electric vehicle is disclosed comprising one or more electrical motors and/or one or more electrical or mechanical subsystems; a drive system coupled to the one or more electrical motors; a set of one more fixed energy storage modules each configured to provide power to at least the drive system, wherein the set of one more fixed energy storage modules collectively is suitably sized in power output to solely and independently drive at least the drive system; a set of one or more exchangeable energy storage module bays, each bay of the one or more exchangeable energy storage module bays being configured to receive an exchangeable energy storage module configured to provide power to at least the drive system, wherein a set of exchangeable energy storage modules when placed in the set of one or more exchangeable energy storage module bays is suitably configured in power output to solely and independently drive at least the drive system; and a multi-mode controller, the multi-mode controller having a processor and memory having instructions stored thereon, wherein execution of the instructions by the processor, cause the processor to control the direction, amount, and/or rate/speed of energy flow from at least one exchangeable energy storage module of the set of two or more exchangeable energy storage modules to the drive system in a first mode; determine when the at least one exchangeable energy storage module has a discharge rate corresponding to a maximum allowable discharge rate for the at least one exchangeable energy storage module when directing energy flow to the drive system; determine available power associated with the energy flow of the at least one exchangeable energy storage module as the at least one exchangeable energy storage module directs energy flow to the drive system; control the direction, amount, and/or rate/speed of energy flow from the fixed energy storage module to the drive system in a second mode based on the determination that the at least one exchangeable energy storage module has a discharge rate corresponding to a maximum allowable discharge rate for the at least one exchangeable energy storage module; and control the direction, amount, and/or rate/speed of energy flow from the at least one exchangeable energy storage to the fixed energy storage module in a third mode based on the determined available power associated with the energy flow of the at least one exchangeable energy storage.

In some embodiments, each bay of the set of one or more exchangeable energy storage module bays comprises a hatch to an internal compartment to retain an exchangeable energy storage module.

In some embodiments, each bay of the set of one or more exchangeable energy storage module bays is configured to adjust between a retaining state and a release state for the exchangeable energy storage module.

In some embodiments, the electric vehicle or hybrid-electric vehicle further includes a fixed energy storage module bay, the fixed energy storage module bay being configured to fixably retain the fixed energy storage module.

In some embodiments, each of the set of one or more of exchangeable energy storage module bays is configured with a quick-disconnect wire connector to electrically connect to energy storage device (e.g., batteries and/or supercapacitors/ultracapacitors) and electronics of the given exchangeable energy storage module.

In some embodiments, each of the set of one or more exchangeable energy storage module bays is configured with a quick insertion and removal to wirelessly connect via wireless power transfer to energy storage device (e.g., batteries and/or supercapacitors/ultracapacitors) and electronics of the given exchangeable energy storage module.

In some embodiments, the electric vehicle or hybrid-electric vehicle further includes a charging port, the multi-mode controller being configured to determine when the charging port is connected to a charging system and to direct charging of the set of one or more fixed energy storage modules and the set of one or more exchangeable energy storage modules based on the determination.

In another aspect, a non-transitory computer readable medium is disclosed for an energy storage system configured with a fixed energy storage module and a set of exchangeable energy storage modules, wherein the computer readable medium has instructions stored therein, wherein execution of the instructions by a processor of a multi-mode controller of the energy storage system cause the processor to control the direction, amount, and/or rate/speed of energy flow from at least one exchangeable energy storage module of the set of exchangeable energy storage modules to a drive system in a first mode, wherein the set of exchangeable energy storage modules is suitably sized in power output to solely and independently drive at least the drive system; determine when the at least one exchangeable energy storage module reached a maximum allowable discharge rate for the at least one exchangeable energy storage module when directing energy flow to the drive system; determine available power associated with the energy flow of the at least one exchangeable energy storage module as the at least one exchangeable energy storage module directs energy flow to the drive system; control the direction, amount, and/or rate/speed of energy flow from the fixed energy storage module to the drive system in a second mode based on the determination that the at least one exchangeable energy storage module has a discharge rate corresponding to a maximum allowable discharge rate for the at least one exchangeable energy storage module, wherein the fixed energy storage module is suitably sized in power output to solely and independently drive at least the drive system; and control the direction, amount, and/or rate/speed of energy flow from the at least one exchangeable energy storage to the fixed energy storage module in a third mode based on the determined available power associated with the energy flow of the at least one exchangeable energy storage.

In some embodiments, execution of the instructions by the processor, further cause the processor to determine a charging module of the energy storage system is electrically connected to a power source and direct charging of the fixed energy storage module and the set of exchangeable energy storage modules in a fourth mode based on the determination.

BRIEF DESCRIPTION OF THE DRAWINGS

The accompanying drawings, which are incorporated in and constitute a part of this specification, illustrate embodiments and together with the description, serve to explain the principles of the methods and systems.

The components in the drawings are not necessarily to scale relative to each other and like reference numerals designate corresponding parts throughout the several views.

DETAILED SPECIFICATION

Each and every feature described herein, and each and every combination of two or more of such features, is included within the scope of the present invention provided that the features included in such a combination are not mutually inconsistent.

Figure 1:
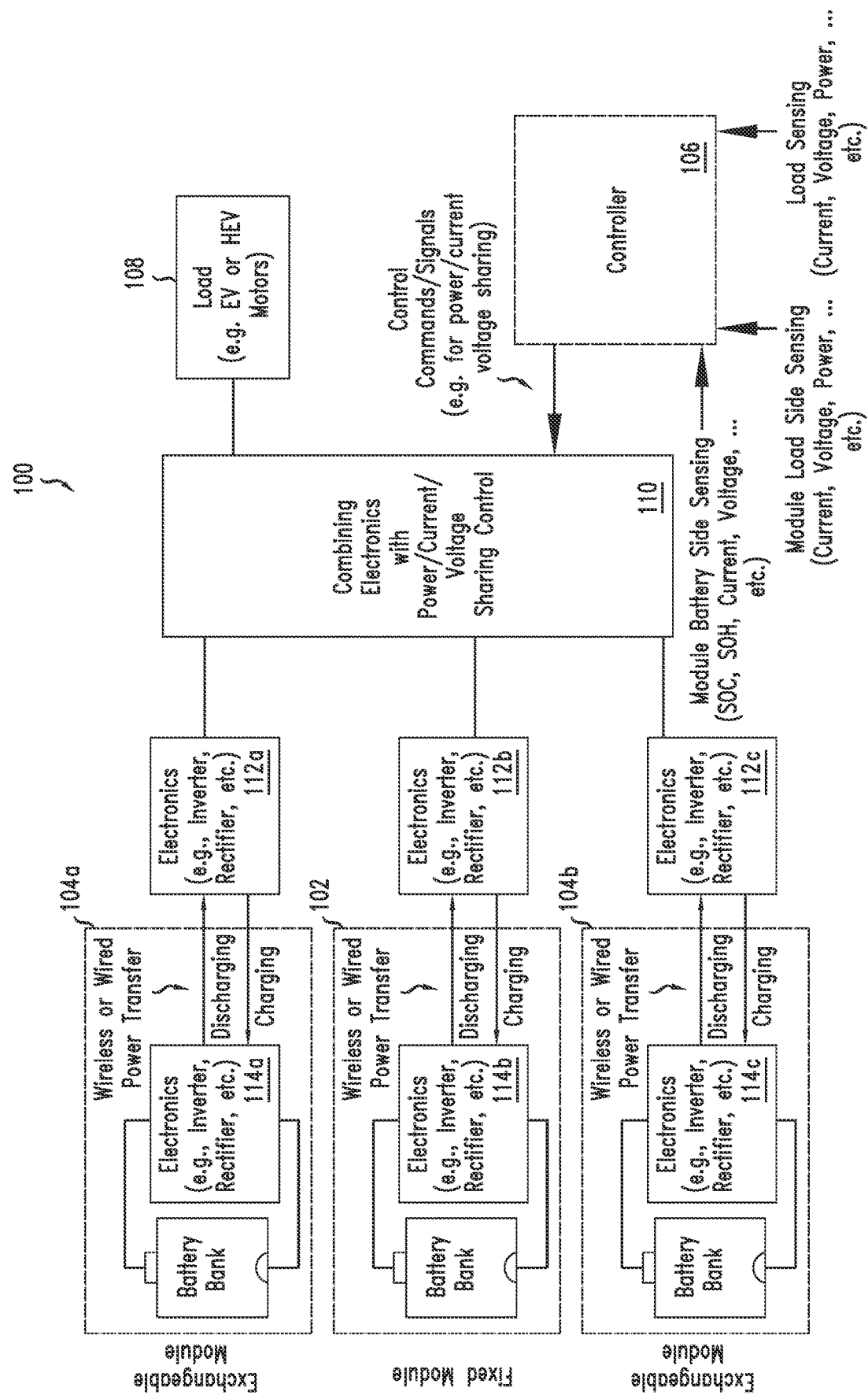
FIG. 1 is a diagram of an exemplary energy storage system in accordance with an illustrative embodiment.

FIG. 1 is a diagram of an exemplary energy storage system 100, for example, of a vehicle system (not shown, see, e.g., FIG. 22), in accordance with an illustrative embodiment. The system 100 is configured with a fixed energy storage module 102 and a set of exchangeable energy storage modules 104 (shown as 104*a* and 104*b*) that is operatively controlled by a multi-mode controller 106. As noted above, the term "vehicle system" may refer to any land-based, air-based, water-based, building-based, or space-based system that can transport a person and/or cargo. Examples of land-based systems includes, but are not limited to, electric or partially-electric cars, buses, vans, trucks, and/or motorcycles.

In FIG. 1, the fixed energy storage module 102 is configured to provide power to a drive system 108 that includes one or more electrical motors (shown as "Load (e.g., EV or HEV Motors)" 108). The term "drive system" and "propulsion system" are used herein interchangeably. The fixed energy storage module 102, in some embodiments, is suitably sized in power output to solely and independently drive at least the drive system at a baseline mode for the drive system. The baseline mode may be an energy efficient or normal mode that is sufficient for the drive system 108 to operate at, say, 100% of the normal intended operation of the vehicle. The fixed energy storage module 102 may operate, e.g., at the baseline mode or at a lower partial power mode that is lower than the baseline mode. Indeed, normal mode may be optimized for efficiency and performance, which in contrast to high performance mode may be optimized for performance without no, or reduced consideration, or efficiency. The intended operation may be quantified in electric motor performance such as instantaneous power (e.g., kilowatt) or mechanical equivalents (such as horsepower), in torque output or acceleration (e.g., time such meters per second).

The multi-mode controller 106 is configured to direct multi-mode operations of the energy storage system 100 and can actuate, and receive sensor inputs from, various vehicle subsystems, including propulsion system, system temperature, propulsion system temperature, environmental controls, vehicle speed and/or acceleration. The multi-mode controller 106, in some embodiments, is also configured to direct charging operation for the energy storing elements of the energy storage system (e.g., 102 and 104), including charging operation from a charging system or inter module-to-module charging operations. The multi-mode controller 106, in some embodiments, is also configured to direct swapping operations exchangeable energy storage modules 104 in the energy storage system 100. In some embodiments, the vehicle is equipped with a plurality of battery modules (which may be smaller) that are exchangeable (which can be wireless for convenience, speed, and safety) modules and one fixed battery modules (which can be larger) and a controller that has several operation modes (e.g., as those described in relation to FIG. 8). The multi-mode system and multi-mode controller facilitates the flow, control, regulation, of energy in multiple directions.

The multi-mode controller 106 is operatively connected to the loads and energy storage module 102 through a set of buses integrated with sensors and controls (shown as module 110 that combines electronics with power, current, voltage sharing controls. The integrated sensors and controls module 110, in FIG. 1, is connected to a set of vehicle power electronics 112 (shown as "Electronics (e.g., Inverter, Rectifier, etc." 112a, 112b, 112c) that are configured to control and regulate the flow of power and energy between the energy storage modules (e.g., 102 and 104) and the vehicle's load 108. In some embodiments, the respective energy storage module (e.g., 102 or 104) may include its own set of power electronics 114 (shown as 114a, 114b, 114c). Example of such integration is described in published PCT International Application No. WO2017/210170A1, which is incorporated by reference herein in its entirety.

Referring still to FIG. 1, the fixed energy storage module 102 may also provide power to other type of load(s), in addition to, or as alternative to, the drive system 108. In vehicle systems, in addition to the propulsions system, these loads may include, but not limited to, steering systems, environmental control systems, heating and cooling systems, lighting systems, communication systems, reclamation system, as well as, various onboard electronics and controls as well as entertainment systems.

The set of exchangeable energy storage modules 104, in some embodiments, are also configured to provide power to at least the drive system and is preferably sized in power output to also solely and independently drive at least the drive system, e.g., at the baseline mode. Preferably, the fixed energy storage modules 102 and the set of exchangeable energy storage modules 104 are sized such that, collectively, the collective power output of both set of modules provides the intended operation of the vehicle system but extends the operating range of the vehicle.

In some embodiments, each module of the set of exchangeable energy storage modules 104 is sized and weighted to allow for ease of removal an insertion. In some embodiments, an exchangeable energy storage module may be packaged in the form factor of a luggage and is weighted less than 50 pounds (designated to be a safe limit to be operated by a single person according to the Occupational Safety and Health Administration (OSHA)). In another embodiments, an exchangeable energy storage module may have a weight of more than 50 pounds such that it can be dragged/pulled or pushed without lifting.

In some embodiments, the vehicle system is configured with a number of exchangeable energy storage modules. In some embodiments, the set of exchangeable energy storage modules has a number of modules selected from the group consisting of 1, 2, 4, 5, 6, 7, 8, 9, 10, 11, 12, 13, 14, and 15. In some embodiments, the set of exchangeable energy storage modules has a number of modules greater or smaller than 15. The sizes of the exchangeable energy storage modules may be delineated into tiers, e.g., normal and extended, among others. They also can be sized differently. The vehicle system may be equipped with swappable compartments for quick insertion and removal of the exchangeable energy storage modules 104. Access of such compartments may be through easily accessible panels located along the vehicle exterior, e.g. at the base region of the vehicle, the forward or rearward compartments (trunk), among others. Examples of such access are later described in relation to FIG. 23. The exchangeable energy storage module 104 may be equipped with electrical quick disconnect and reconnect connectors. In some embodiments, the vehicle has a fixed battery and several exchangeable battery modules that can be accessed from one or more compartments located under the vehicle (with some optional modules in other locations such as in a trunk) through a door (which can be access protected by a key, keyless remote controller, code, biometric code (e.g., fingerprint), or any other method) that can slide down for ease of removal and addition of battery modules. These modules can be wireless battery modules.

Similarly, the fixed energy storage module 102 may include a number of submodules. The fixed energy storage module 102, in some embodiments, are conventional battery pack modules that are mounted to a vehicle. The battery pack may include one or more Li-ion batteries, nickel-metal hydride batteries, lead-acid batteries, or any rechargeable batteries. Access to such modules may be through the undercarriage of the vehicle or other serviceable locations. The fixed energy storage module 102 may be configured quick insertion and removal at designated bays or compartments in the vehicle similar to the compartments for the exchangeable energy storage modules 104. In some embodiments, the exchangeable energy storage module 104 are configured with inductive or capacitive charging transceivers to provide wireless charging operation and/or coupling to the electrical bus of the vehicle system. Examples of exchangeable energy storage module 104 with inductive or capacitive charging transceivers are described in published PCT International Application No. WO2017/210170A1, which is incorporated by reference herein in its entirety.

The fixed energy storage modules 102 may be sized for more limited range operation than that which is expected on a daily use or typical operation, e.g., for daily commute. Exchangeable energy storage modules 104 are then used to supplement such range or operation. For example, the fixed energy storage module 102 can be sufficiently sized in energy storage for 30 to 50 miles of continuous driving, which may be sufficient for most daily commute of an average commuter. The fixed energy storage module 102 are then augmented by exchangeable energy storage modules 104 when additional range is desired, or needed, for example, for longer trips. One or more exchangeable module can also be used to charge the fixed module while driving.

Further, with the set of exchangeable energy storage modules 104 excluded, or partially excluded, from daily limited range operation, the weight associated with such modules can be removed from the vehicle. Say there at 10 of such modules and each weights 50 lbs, for a standard-sized sedan (which is around 3300 lbs), such reduction (e.g., 500 lbs) is equivalent to 15% of the vehicle weight. Such weight reduction can contribute a benefit of 10% in driving efficiency. For electric vehicle, in which energy storage is one of the heaviest component in the system, such weight reduction can contribute a benefit of 10% in driving efficiency.

Charge while Drive Operation

In some embodiments, the set of exchangeable energy storage modules 104 and vehicle infrastructure and controls are configured, when excess output and stored capacity are available, to provide charge-while-driving operation to the fixed energy storage modules 102. That is, in addition to providing extended range operation, the set of exchangeable energy storage modules 104 can also serve as a power source to charge the fixed energy storage module 102. To this end, the charging of the fixed energy storage modules 102 may be decoupled from when the vehicle is connected to a charging station and can be independently optimized for temperature, overall charging efficiency, charging rate and time, charging levels, etc.

In such operation, the set of exchangeable energy storage modules 104 may be sized to operate at, or more than, 100% of the normal intended operation of the vehicle. During drive mode, the vehicle drive system may draw power/energy from the set of exchangeable energy storage modules 104 and suitable excess power/energy capacity, when available, e.g., as determined by the multi-mode controller 106, may be used to charge the fixed energy storage modules 102. Such operation can thus provide for longer range or duration trips as well as for trips when there are no time for conventional charging, e.g., at a charging station.

Indeed, the vehicle architecture may include several wireless and/or wired energy storage modules such as battery modules which allows for the easy access to exchange and/or swap of these modules. In some embodiments, the modules are configured to charge each other directly (e.g., direct coupling), or indirectly (e.g., through an intermediary such as the multi-mode controller or underlying electronics) while the vehicle is driving or while at parked.

Example Multi-Mode Operation

FIGS. 2-7 each shows an example multi-mode operation of the example energy storage system of FIG. 1 in accordance with an illustrative embodiment. As noted above, the multi-mode system (e.g., 102 and 104) and multi-mode controller (e.g., 106) facilitates the flow, control, regulation, of energy in multiple directions.

Figure 2:
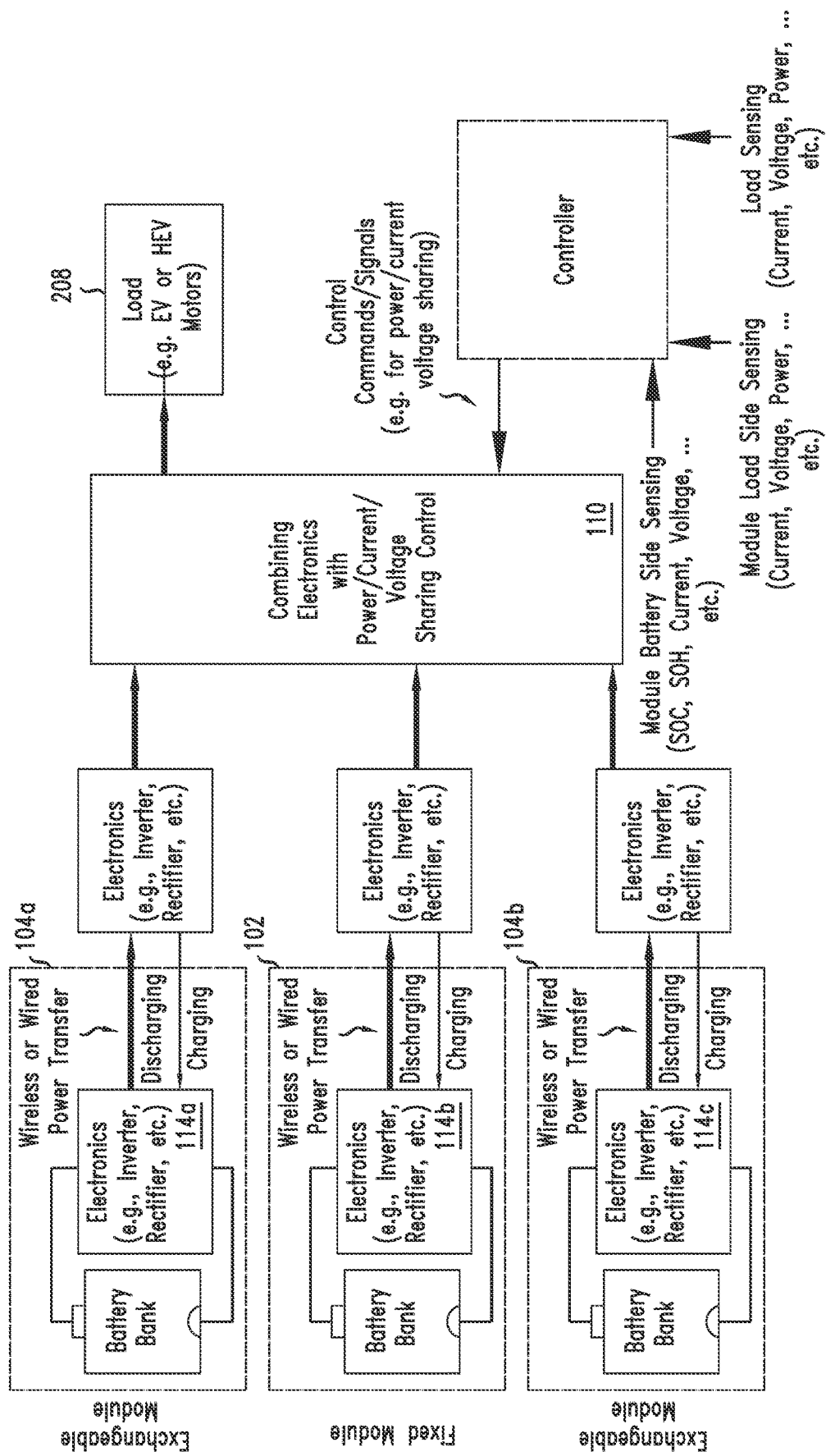
FIG. 2 shows a first mode of the example energy storage system in providing energy flow from all modules, including the fixed energy storage module and the exchangeable energy storage modules to the power load in accordance with an illustrative embodiment.

FIG. 2 shows a first mode of the example energy storage system 100 in providing energy flow from all modules, including the fixed energy storage module 102 and the exchangeable energy storage modules 104a, 104b to the power load 108.

FIG. 2 shows a first mode (shown as "Mode 1") of the example energy storage system 100 in providing energy flow from all modules, including the fixed energy storage module 102 and the exchangeable energy storage modules 104a, 104b to the power load 108. In some embodiments, the first mode may be used when the fixed energy storage module 102 is generally full and/or when additional power is required by the drive system or other loads.

Though shown with both exchangeable energy storage modules 104 providing power output, it should be understood that the multi-mode controller 106 may disable output of one or more exchangeable energy storage modules 104 (e.g., due to fault or due to the energy in the respective module being depleted or is lower a specified threshold). The multi-mode controller 106 may employ close-loop control to adjust operation in this mode based on sensor inputs including from module load side sensors and load sensing side sensors.

Figure 3:
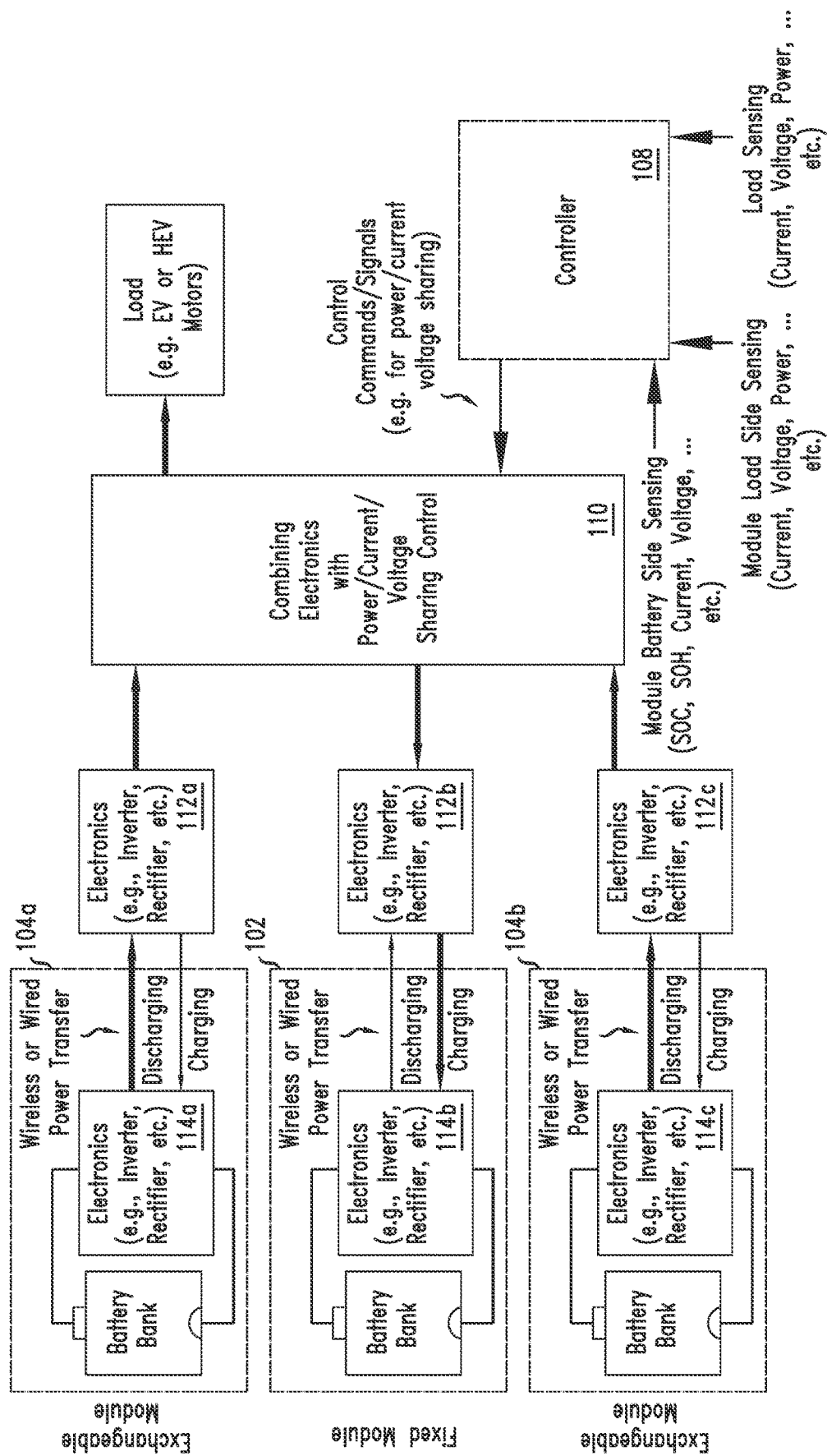
FIG. 3 shows a second mode of the example energy storage system of FIG. 1 in providing energy flow from the exchangeable energy storage modules to the power load while concurrently charging the fixed energy storage module in accordance with an illustrative embodiment.

FIG. 3 shows a second mode (shown as "Mode 2" also referred to as charge while drive operation discussed herein) of the example energy storage system 100 in providing energy flow from the exchangeable energy storage modules 104 to the power load 108 while concurrently charging the fixed energy storage module 102.

In some embodiments, the power are drawn equally among the available exchangeable energy storage modules 104. In other embodiments, the power are drawn from the available exchangeable energy storage modules 104 while regulating for temperature, among other parameters. In yet other embodiments, the system is configured to deplete the energy from an initial set of one or more exchangeable modules before starting to deplete the energy from the next set of one or more exchangeable modules (this for example allows the ability to exchange depleted modules when possible/available in order to always maintain more charged modules or energy in the vehicle fir longer drive range when needed).

In FIG. 3, it is shown that energy is directed from the exchangeable energy storage modules 104a and 104b to the fixed energy storage module 102 through the power electronics and integrated sensors and controls module (110, 112a-114c and 114a-114c). It should be appreciated that in certain embodiments, the energy from the exchangeable energy storage modules 104a and 104b may be directed to the fixed energy storage module 102 directly, for example, through direct couple that may exist between the fixed energy storage module 102 and the power electronics (e.g., 114a, 114c) of the exchangeable energy storage module 104. The multi-mode controller 106 may employ close-loop control to adjust multi-module charging and discharging operation in this mode based on sensor inputs including from module load side sensors and load sensing side sensors.

Figure 4:
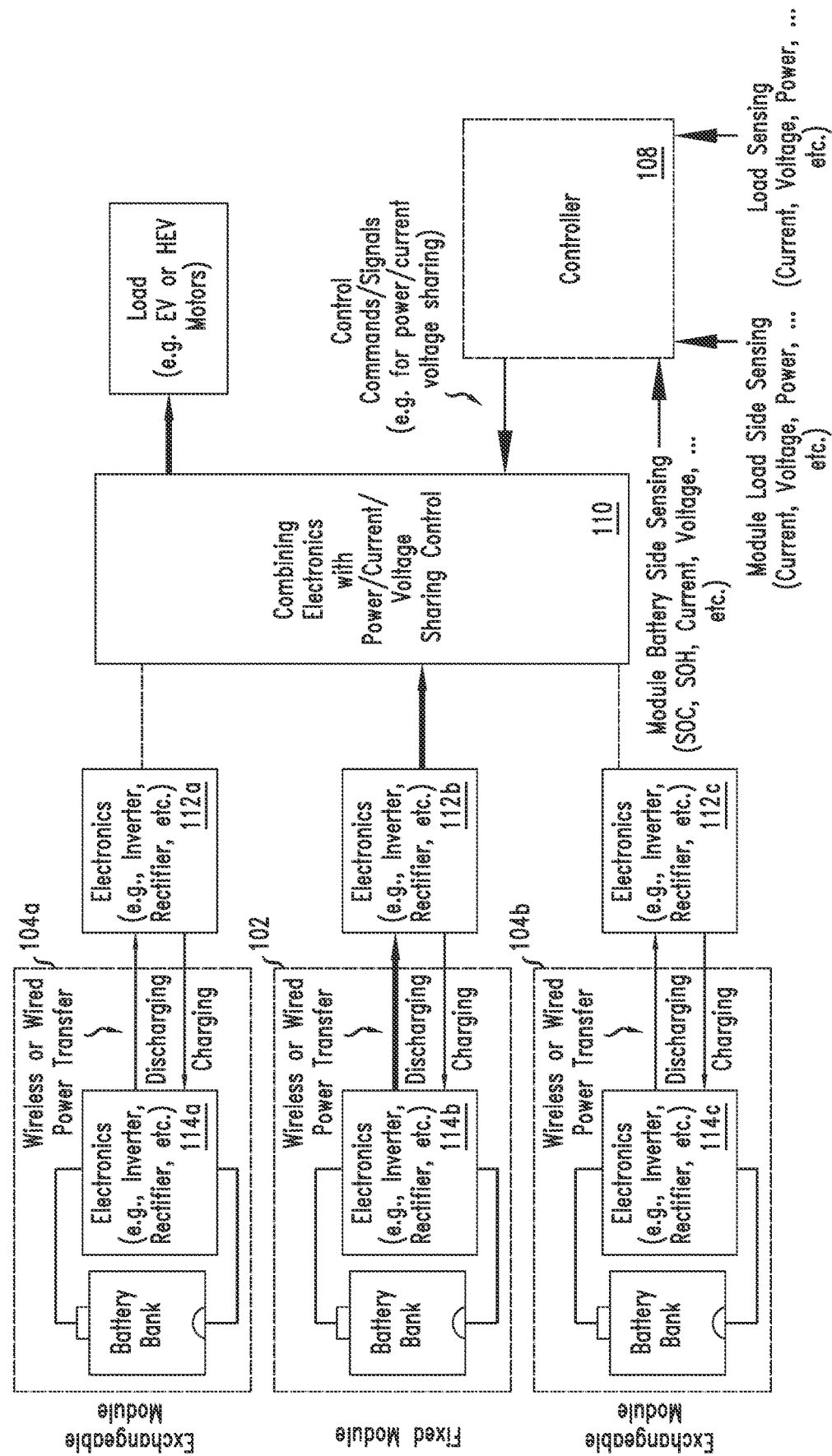
FIG. 4 shows a third mode of the example energy storage system in providing energy flow from the fixed energy storage module to the power load in accordance with an illustrative embodiment.

FIG. 4 shows a third mode (shown as "Mode 3") of the example energy storage system 100 in providing energy flow from the fixed energy storage module 102 to the power load

108. This mode may occur when no exchangeable energy storage modules 104 are connected to the energy system 100 or when the energy of the exchangeable energy storage modules 104 are depleted. In this mode, the multi-mode controller 106 may direct the vehicle power electronics (e.g., 112a, 112c) to isolate the exchangeable energy storage modules 104a, 104b. In some embodiments, the multi-mode controller 106 may direct the electrical bus connected to the exchangeable energy storage modules 104a, 104b to be opened, e.g., via relays located in the electric bus. The multi-mode controller 106 may employ close-loop control to adjust fixed-module operation in this mode based on sensor inputs including from module load side sensors and load sensing side sensors.

Figure 5:
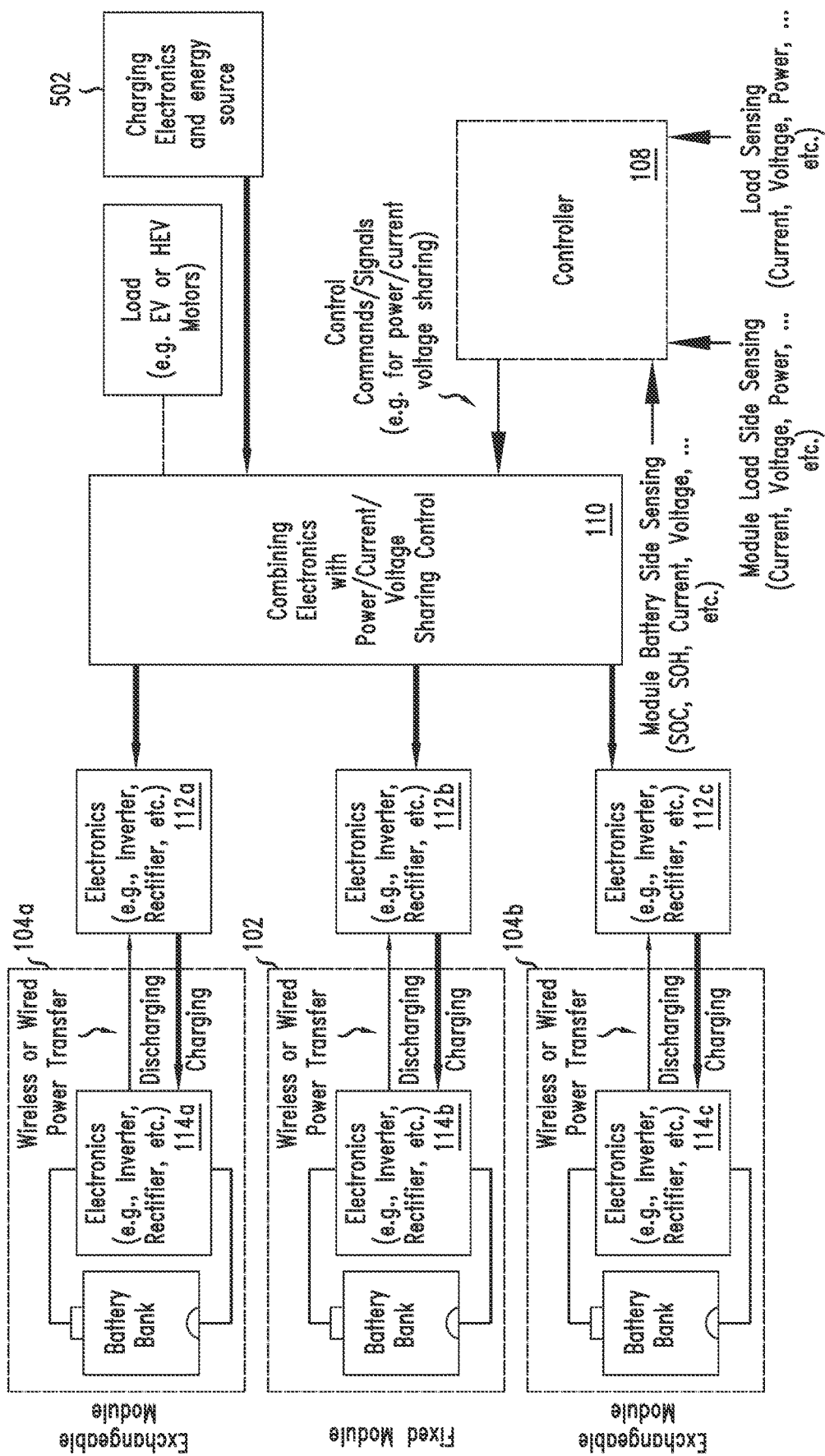
FIG. 5 shows external charging operation from a charging station to each of the fixed energy storage module and the set of exchangeable energy storage modules in accordance with an illustrative embodiment.
Figure 6:
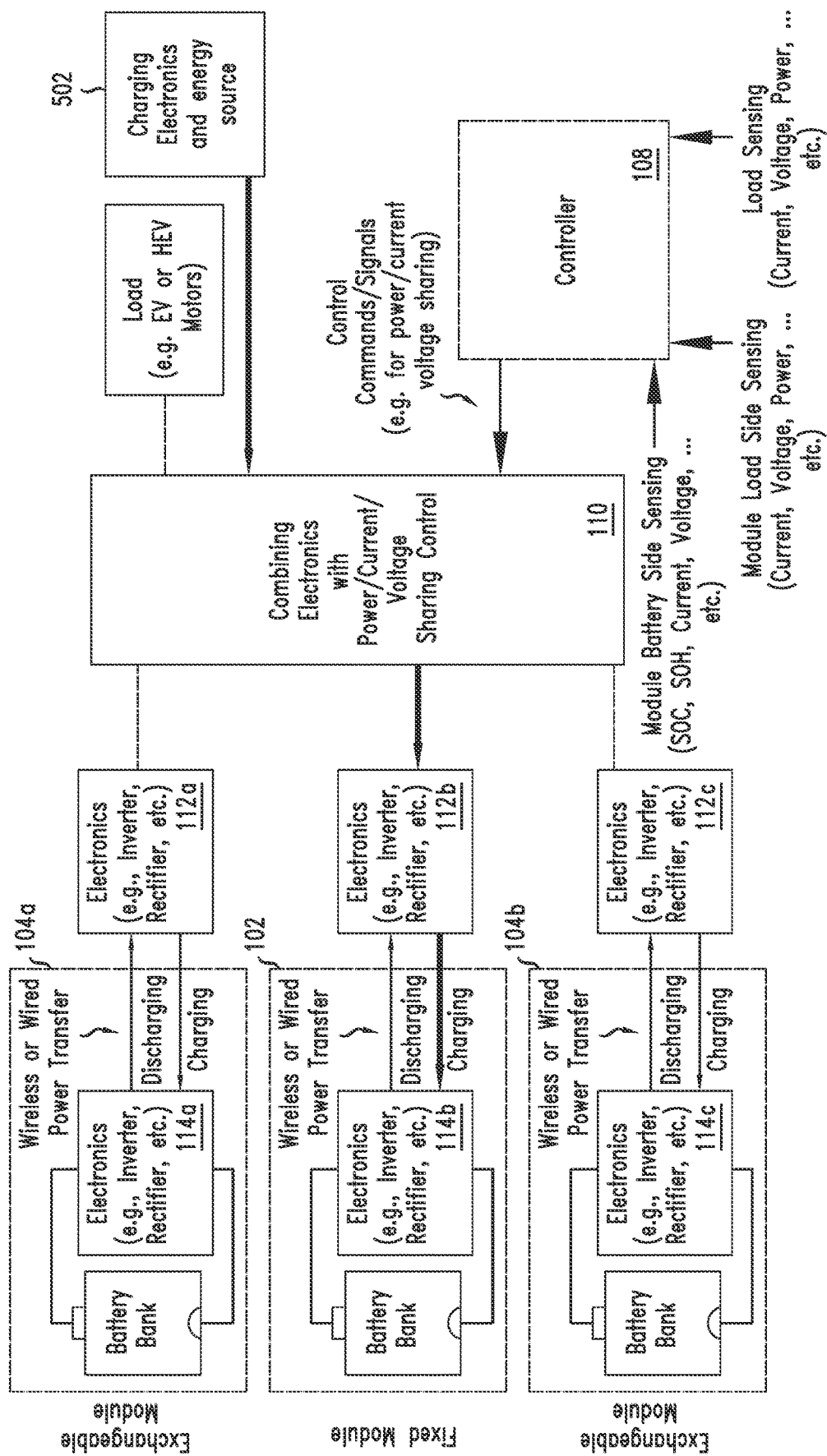
FIG. 6 shows external charging from a charging station to the fixed energy storage module only in accordance with an illustrative embodiment.
Figure 7:
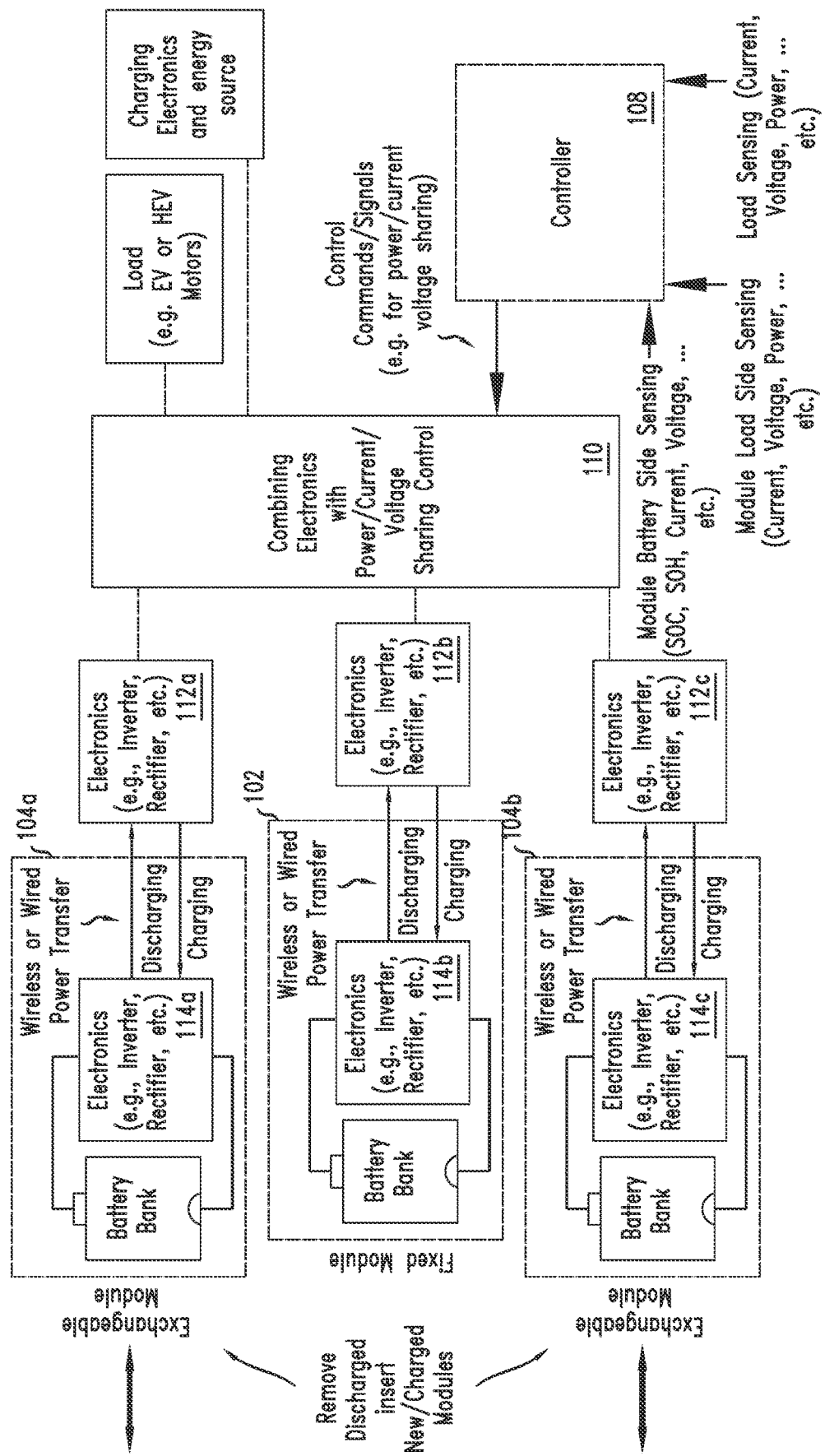
FIG. 7 shows quick exchange charging of one or more exchangeable energy storage module via module swap or exchange operations (with another exchangeable energy storage module) in accordance with an illustrative embodiment.

FIGS. 5-7 show several charging modes (shown as "Mode 4—Option X", "Mode 4—Option Y", and Option 4—Option Z") of the example energy storage system 100 in accordance with an illustrative embodiment.

FIG. 5 shows external charging operation from a charging station (shown as "Charging electronics and energy source" 502) to each of the fixed energy storage module 102 and the set of exchangeable energy storage modules 104. In FIG. 5, the charging station 502 is connected to the integrated sensors and controls module 110. The multi-mode controller 106 directs the power electronics 112a, 112b, and 112c to charge the energy storage modules 102, 104a, 104b. The multi-mode controller 106 may direct a charge level, voltage level, or current charge level for the charging operation. The multi-mode controller 106 may employ close-loop control to adjust charging rate or state based on sensor inputs including from module load side sensors and load sensing side sensors.

FIG. 6 shows external charging from a charging station (shown as "Charging electronics and energy source" 502) to the fixed energy storage module 102 only. In FIG. 6, the charging station 502 is connected to the integrated sensors and controls module 110. The multi-mode controller 106 directs the power electronics 112b of the fixed energy storage module 102 to charge the energy storage module 102, e.g., when no exchangeable energy storage modules 104 are present or connected to the vehicle or when the exchangeable energy storage modules are at full charge capacity. The multi-mode controller 106 may direct a charge level, voltage level, or current charge level for the charging operation. The multi-mode controller 106 may employ close-loop control to adjust charging rate or state based on sensor inputs including from module load side sensors and load sensing side sensors.

FIG. 7 shows quick charging of one or more exchangeable energy storage module 104 via module swap or exchange operations. In this mode, the multi-mode controller 106 may direct each exchangeable energy storage module 104 to be electrically isolated from the system. In some embodiments, the multi-mode controller 106 also directs the fixed energy storage module 102 to be isolated from the system.

In modules configured with locking mechanisms, the multi-mode controller 106 may direct locking mechanisms associated with the respective modules to be unlocked so it can be removed from its respective compartment and for the locking of a new module (e.g., with full charge state) once inserted into the compartment as a replacement.

Example Method of Operation of Multi-Mode Controller

Figure 8:
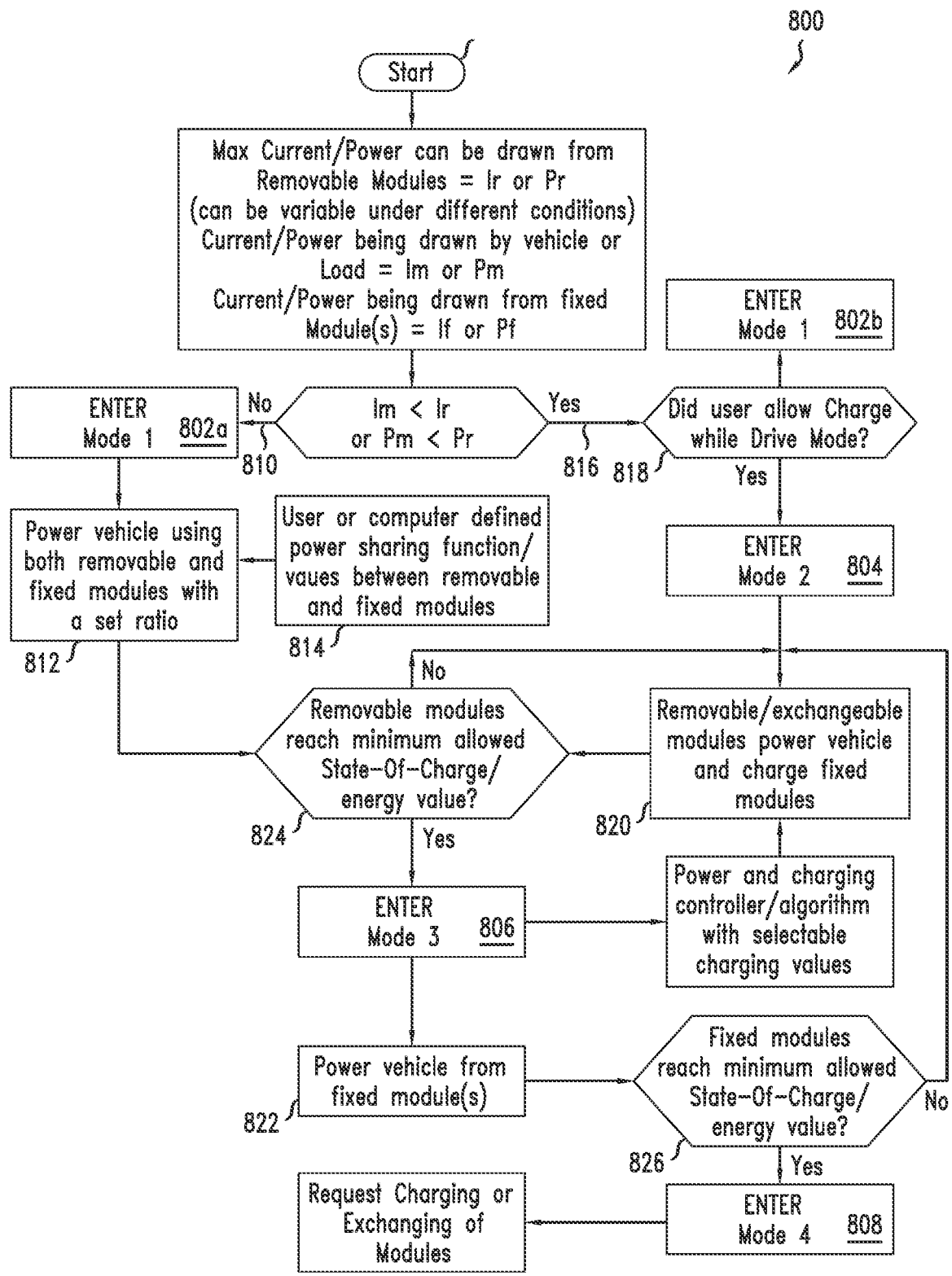
FIG. 8 shows a diagram for multi-mode control of the energy storage system in accordance with an illustrative embodiment.
Figure 9:
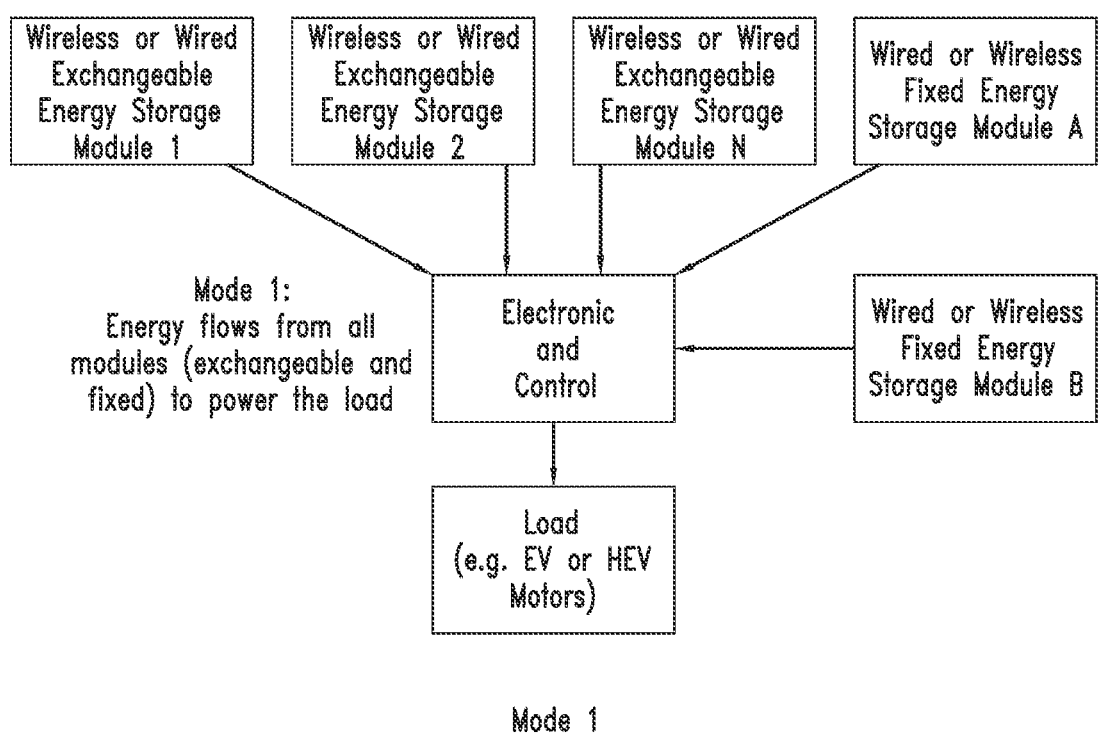
FIGS. 9-14 show schematics for an example implementation of the system and the related modes of operations and is disclosed below in conjunction with FIG. 8 in accordance with an illustrative embodiment.
Figure 10:
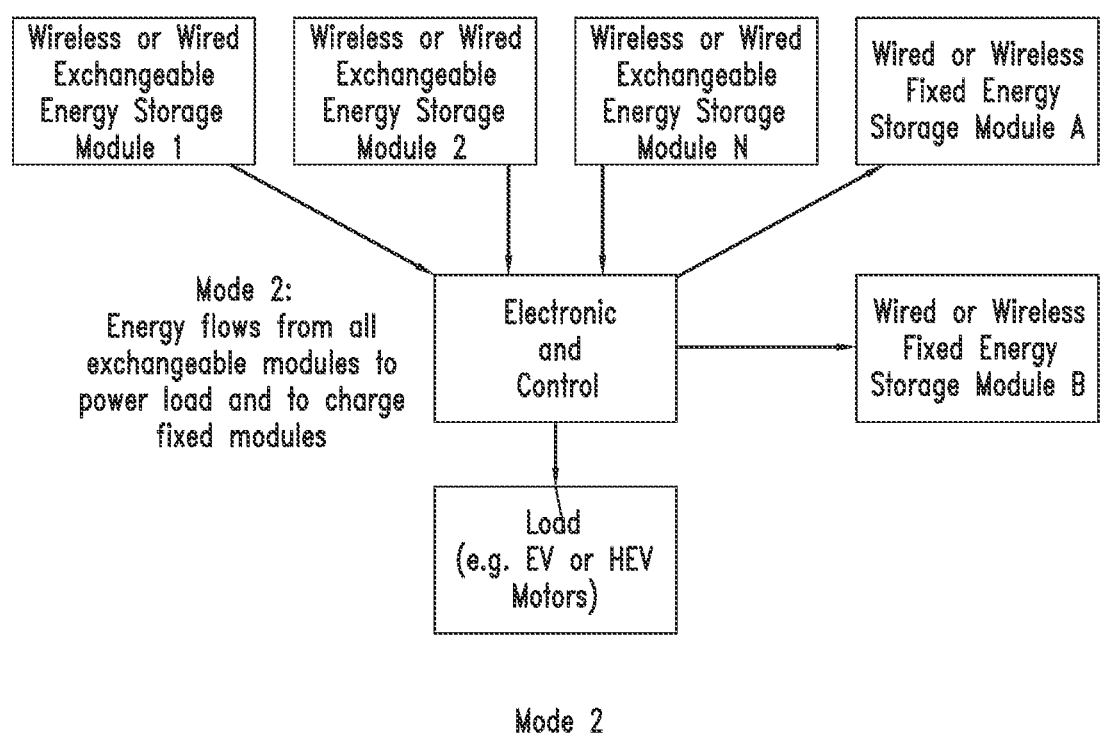
Figure 11:
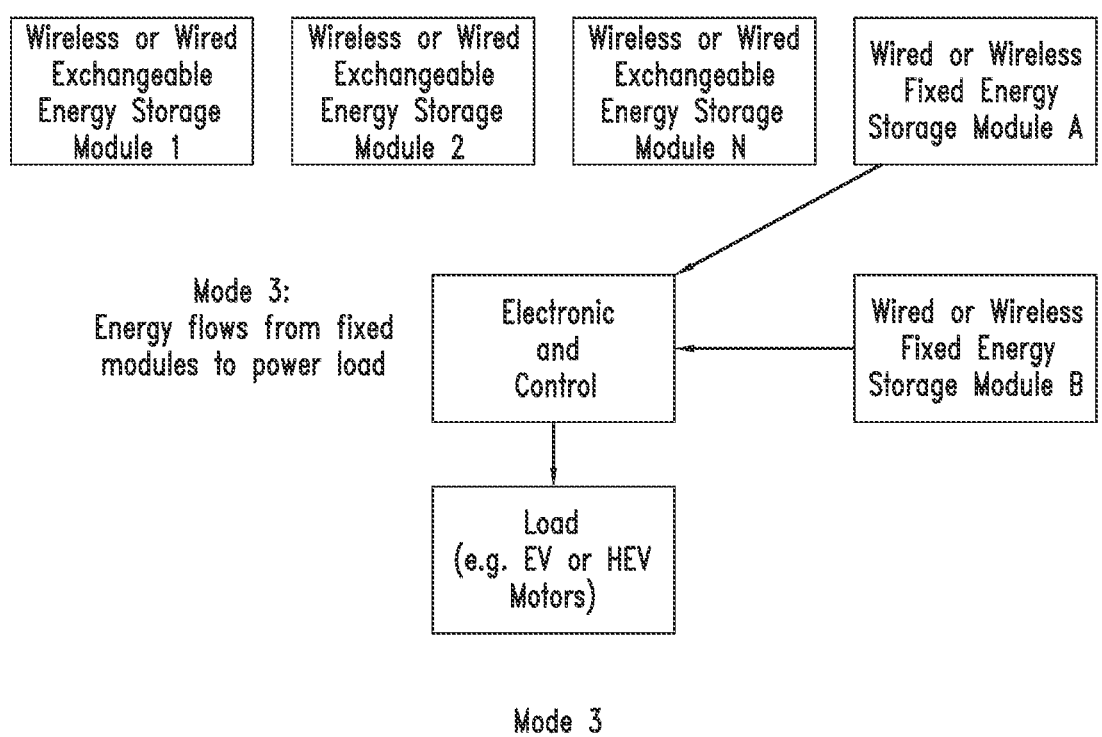
Figure 12:
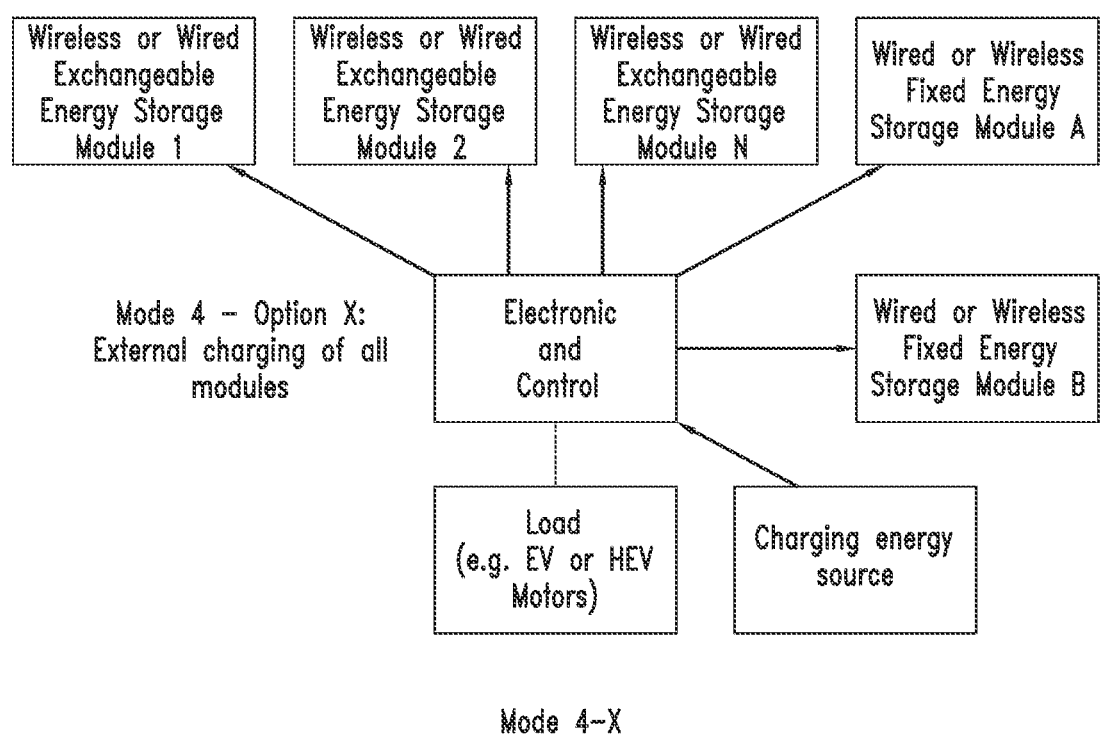
Figure 13:
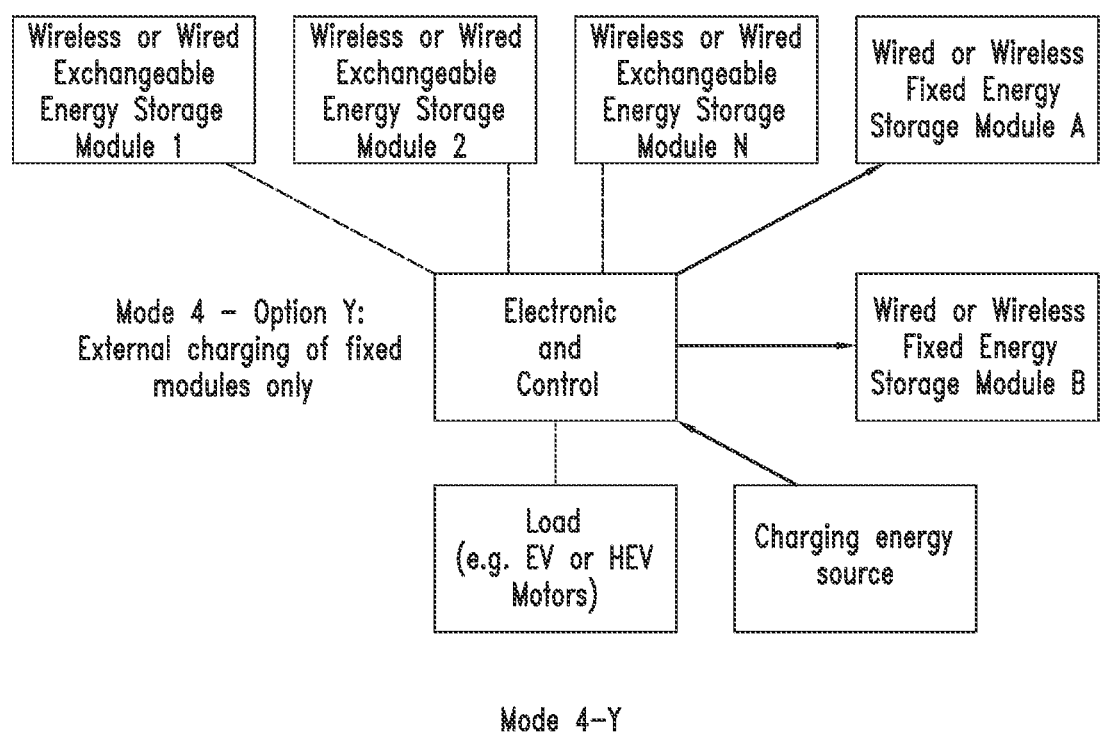
Figure 14:
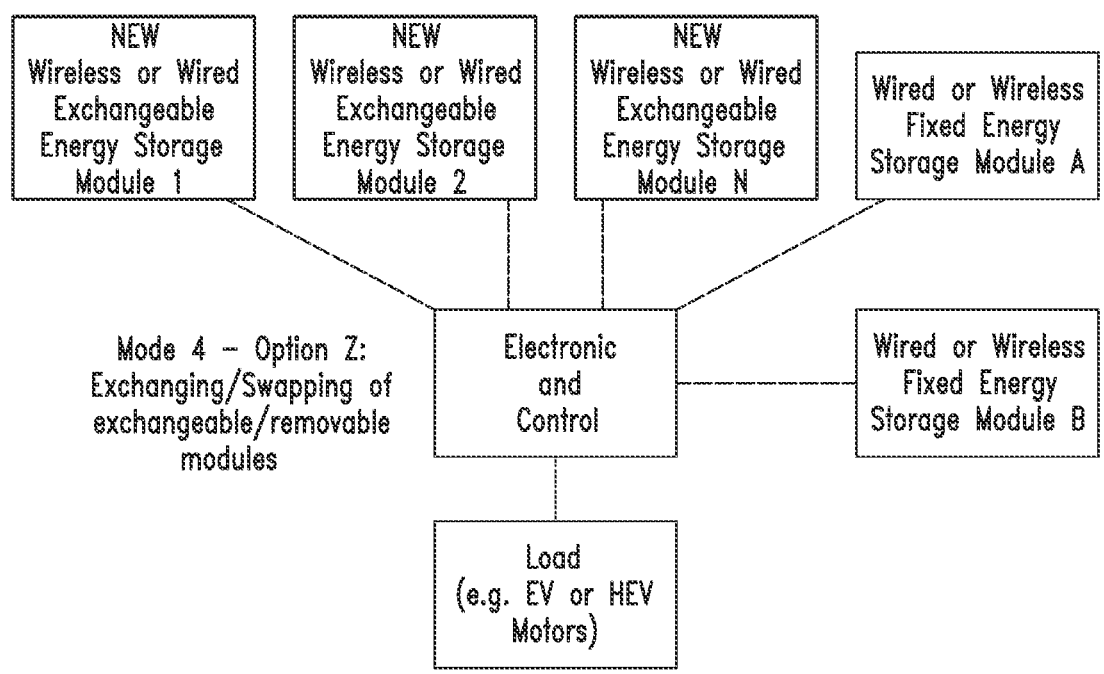

FIG. 8 shows a diagram for multi-mode control of the energy storage system in accordance with an illustrative embodiment. FIGS. 9-14 show example schematics for an example implementation of the system and the related modes of operations and is disclosed below in conjunction with FIG. 8.

As shown in FIG. 8, the multi-mode controller 106 is configured with multiple modes (shown as "Mode 1" 802, "Mode 2" 804, "Mode 3" 806, and "Mode 4" 808) corresponding to the discussion provided in relation to FIGS. 2-7. The multi-mode controller 106 may provide targeted setpoints during charging station operation or inter-module charging operation to maintain the fixed energy storage module 102 at a high or desired State-Of-Charge (SOC) when possible. To this end, the multi-mode controller 106 may only draw energy from the fixed energy storage module when needed, e.g., when the exchangeable energy storage modules 104 reaches their maximum allowable discharge rate or when the SOC(s) of the exchangeable energy storage module(s) 104 reaches a minimum value or zero value. Further, the multi-mode controller 106 may charge the fixed energy storage module 102 from the exchangeable energy storage modules 104 (e.g., during Module-to-Module Charge-While-Drive Mode, M2M-CWD mode) when the energy/power needed by the vehicle is less than the maximum power that can be supplied from the exchangeable modules. That is, when the multi-mode controller 106 determines the maximum power that can be supplied by the exchangeable/removable module (Pr) is less than the amount of power (Pm) currently being drawn and/or consumed by the vehicle (i.e., Pr<Pm). Then, the exchangeable energy storage modules 104 may charge the fixed energy storage module 102 by available excess power (e.g., calculated as Pr−Pm). The charging setpoint may be dynamically adjusted during driving or parking modes based on measured vehicle instantaneous power use (Pm) and available power from the exchangeable energy storage modules (Pr). The multi-mode controller 106, in some embodiments, optimizes the charging setpoint for the exchangeable energy storage modules 104 and/or the fixed energy storage module 102 based on one or more measured or derived parameters, including, for example, but not limited to charging efficiency, module temperature, outdoor temperature, cooling temperature, state-of-charge, SOH (State-Of-Health), driver/user selection, and a combination thereof.

In FIG. 8, in Mode "1" 802 (shown as 802a and 802b), the multi-mode controller 106 is configured to direct energy flows from all modules (exchangeable and fixed energy storage modules 102, 104) to power the load 106. This mode may be suitable when all modules are determined to have available energy. That is, the energy of the fixed energy storage module 102 and the exchangeable energy storage module are above a pre-defined charge setpoint. In mode 802, the controller 106 may direct discharge of the energy/power from each modules based on charging efficiency, module temperature, outdoor temperature, cooling temperature, state-of-charge, SOH (State-Of-Health), driver/user selection, and a combination thereof.

The multi-mode controller 106 may enter (810) mode "1" 802a when the measured/expected current use (Im) or measured/expected power use (Pm) by the vehicle load 108 exceeds the current or power output of the exchangeable energy storage module 104 (shown as Ir and Pr, respectively). As shown in FIG. 8, vehicle load 108 may be powered (812) using both the removable and fixed energy storage modules. The controller 106 may use (816) a user-defined power setpoint or computer-defined power sharing function to allocate the consumption between the exchangeable energy storage module 104 and the fixed energy storage module 102.

The controller 106 may also enter (816) mode "1" 802b when the measured/expected current use (Im) or measured/expected power use (Pm) by the vehicle load 108 is below the current or power output of the exchangeable energy storage module 104 (shown as Ir and Pr, respectively).

In FIG. 8, in Mode "2" 804 (see also 820), the multi-mode controller 106 is configured to direct energy flows from all available exchangeable energy storage modules 104 to the power load 108 and to charge the fixed energy storage module 102. The multi-mode controller 106 may enter (818) mode "2" (804) when the user enable charge-while-drive mode.

In FIG. 8, in Mode "3" 806 (see 822), the multi-mode controller 106 is configured to direct energy flows only from the fixed energy storage module 102 to the vehicle load 108. The multi-mode controller 106 may enter (824) this mode after it determines the exchangeable energy storage modules 104 are empty (e.g., having zero state of charge) or reaches a minimum set level for the state of charge. The multi-mode controller 106 may maintain (826) the energy storage system 100 in this mode until the fixed energy storage module reaches a minimum allowed state of charge, for example.

In FIG. 8, in Mode "4", the multi-mode controller 106 is configured to direct the energy storage system for charging from an external charging station or for a quick swap operation of the exchangeable energy storage modules 104. As discuss, in option "X" (not shown), the multi-mode controller 106 directs the external charging of the energy storage modules 102, 104. This is one of the options after all modules become empty (zero SOC) or reach a minimum set level for SOC or when the user/driver would like to charge all modules.

In Mode "4" option "Y", the multi-mode controller 106 is configured to direct the external charging of fixed modules only. This is one of the options when the user/driver would like to charge the fixed module(s) only.

In Mode "4" option "Z", the multi-mode controller 106 is configured to direct the exchange and/or swapping of exchangeable/removable modules. This is one of the options when the user/driver would like to exchange/swap the exchangeable/removable module(s) only which can be used to power the vehicle and/or charge the fixed module while driving or parking.

In some embodiments, the multi-mode controller 106 may direct the vehicle to provide instructions via the onboard multimedia system or graphical user interface of the specific mechanisms to open access to the exchangeable energy storage modules 104, to disconnect it from the vehicle, to properly remove and store it, and to insert and reconnect replacement exchangeable energy storage modules.

The Module-to-Module Charge-While-Drive (M2M-CWD) mode may be used to reduce downtime needed for charging. The mode can charge the fixed battery of the vehicle using the multi-mode controller 108 while driving or parking. The exchangeable energy storage modules 104 can be exchanged/swapped with full ones so the charging of the fixed energy storage module can continue.

Example Energy Storage System with Wireless Modules

Figure 15:
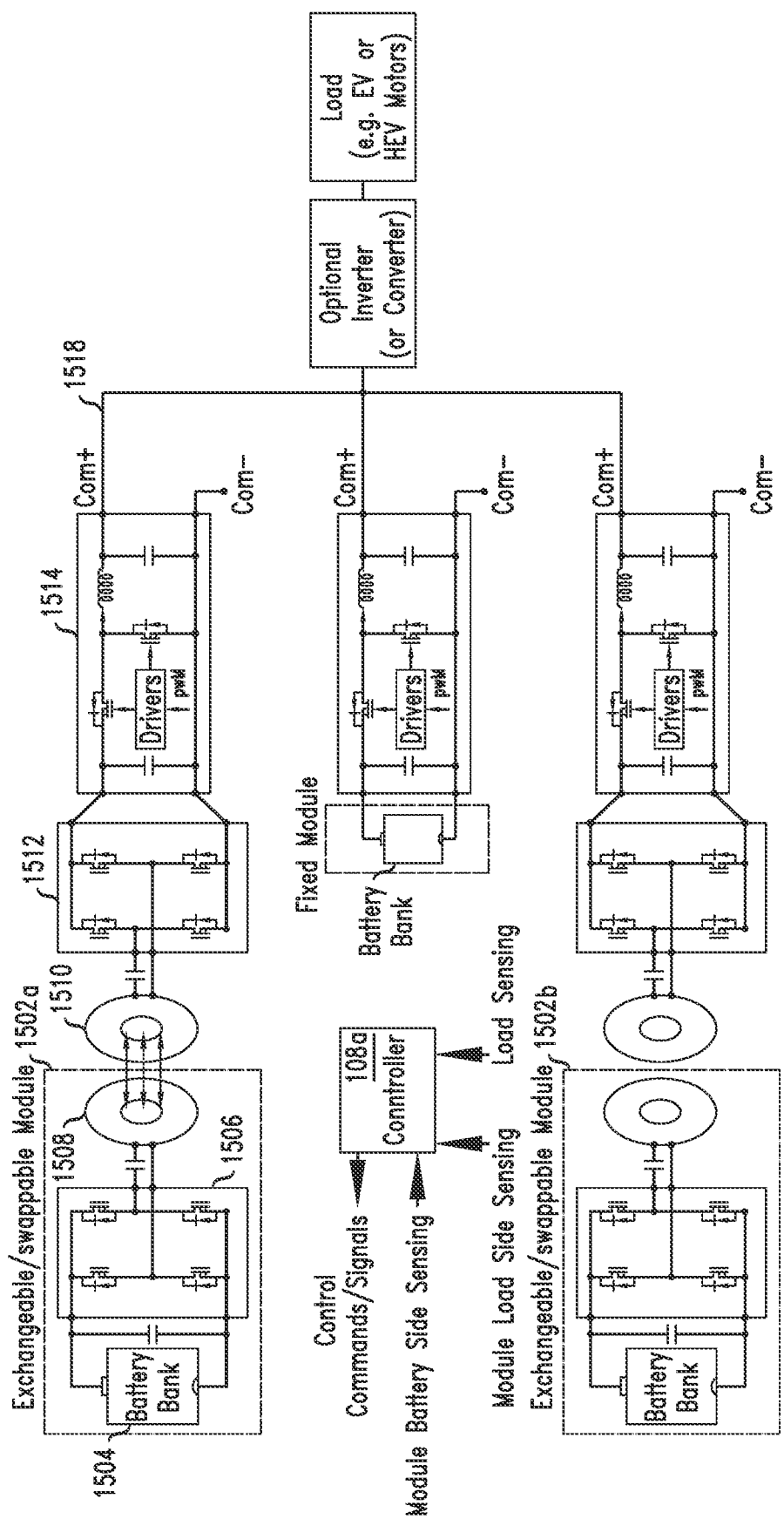
FIG. 15 shows an example energy storage system configured with wireless exchangeable energy storage modules in accordance with an illustrative embodiment.
Figure 16:
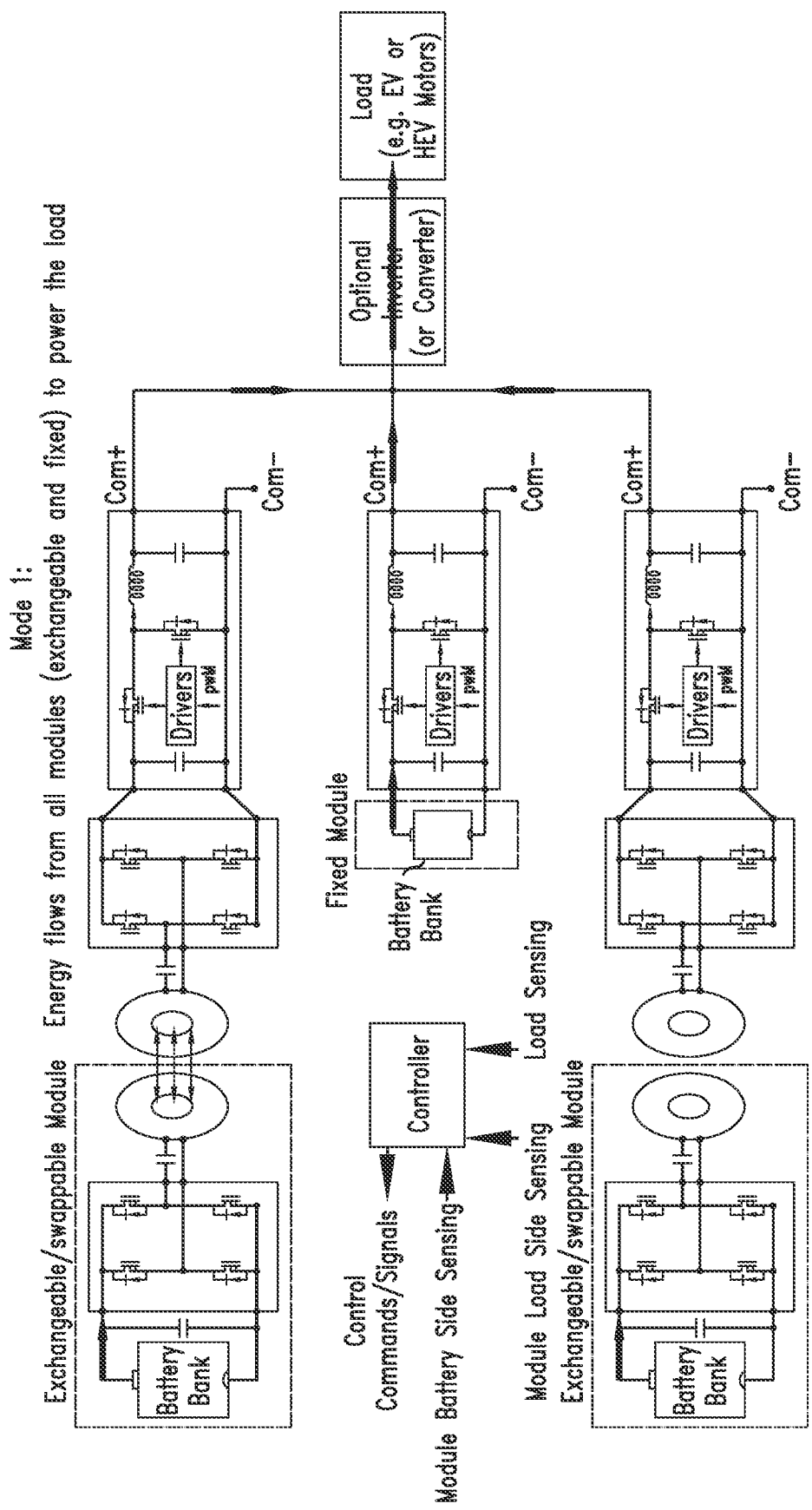
FIGS. 16-21 each shows the respective multi-mode operation of FIGS. 2-7 in the example energy storage system of FIG. 15 configured with wireless exchangeable energy storage modules in accordance with an illustrative embodiment.
Figure 17:
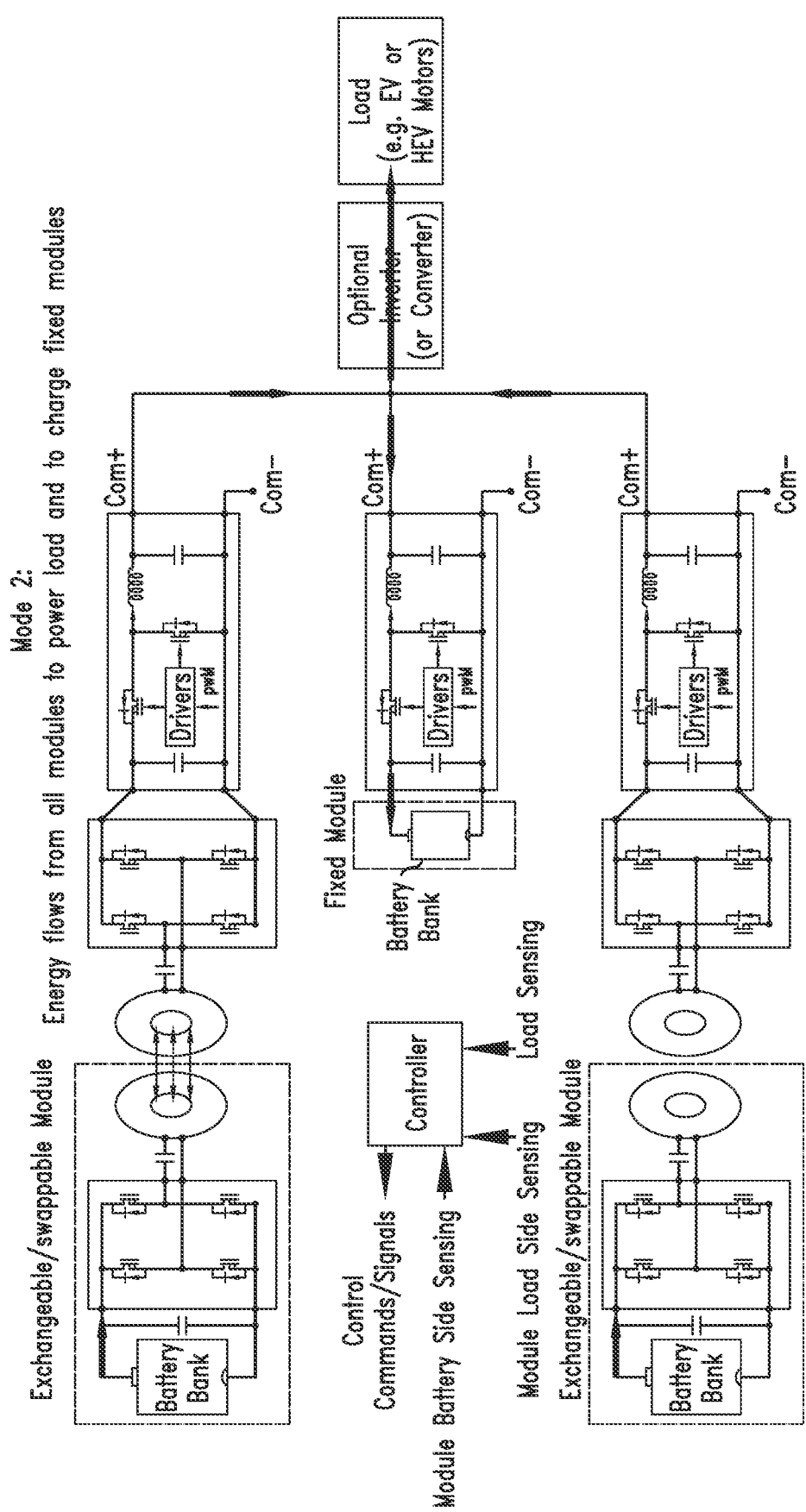
Figure 18:
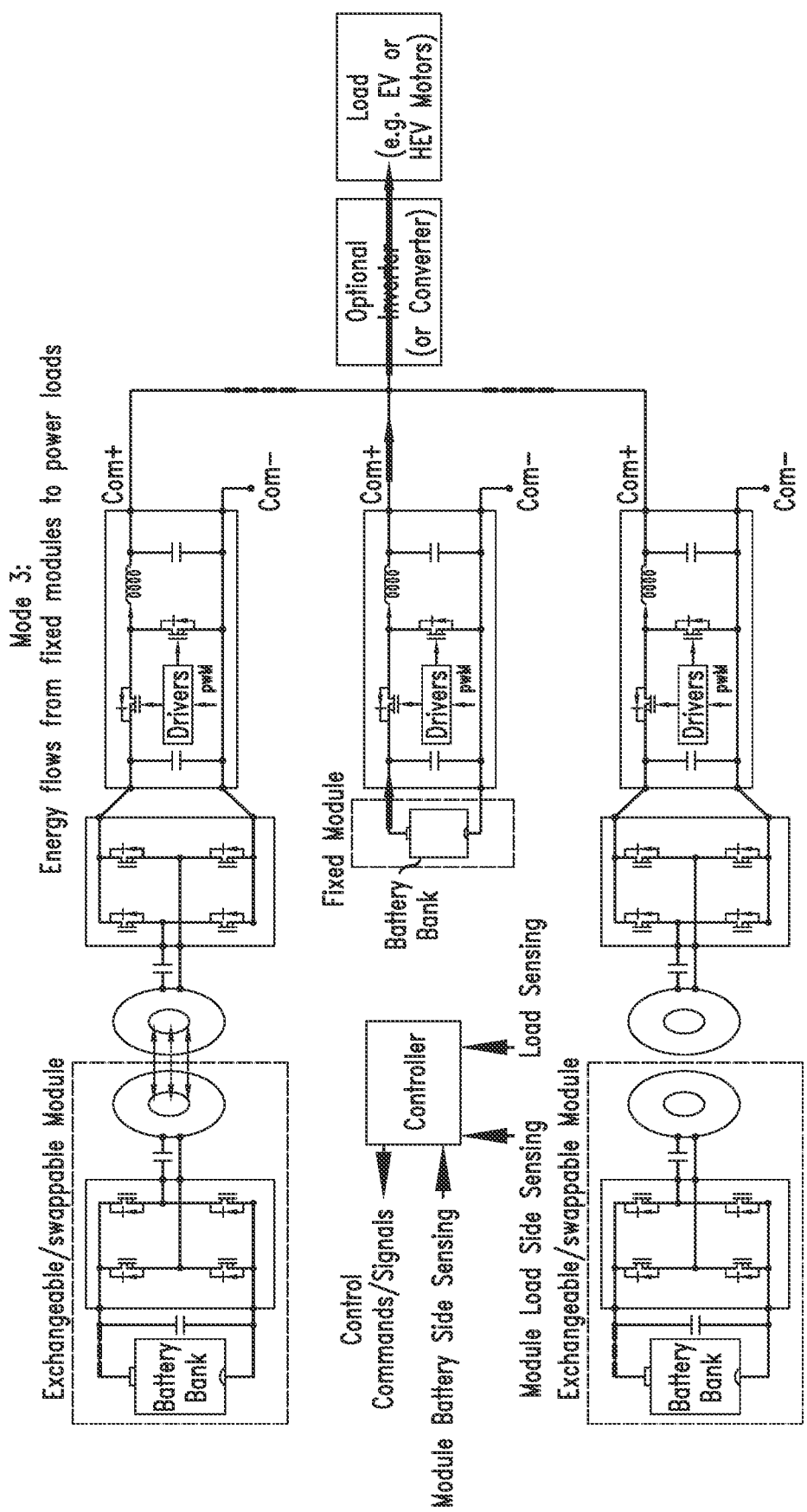
Figure 19:
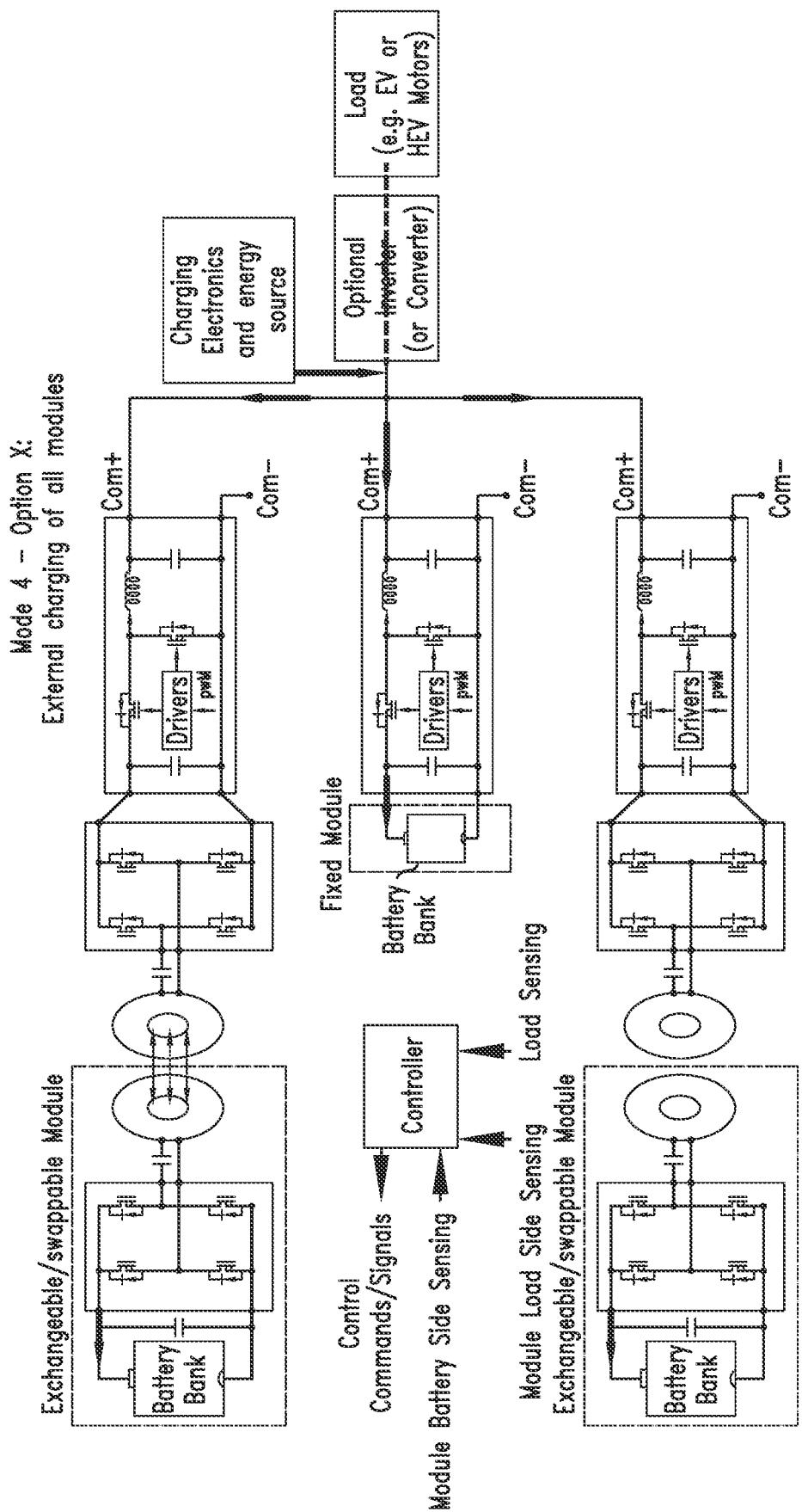
Figure 20:
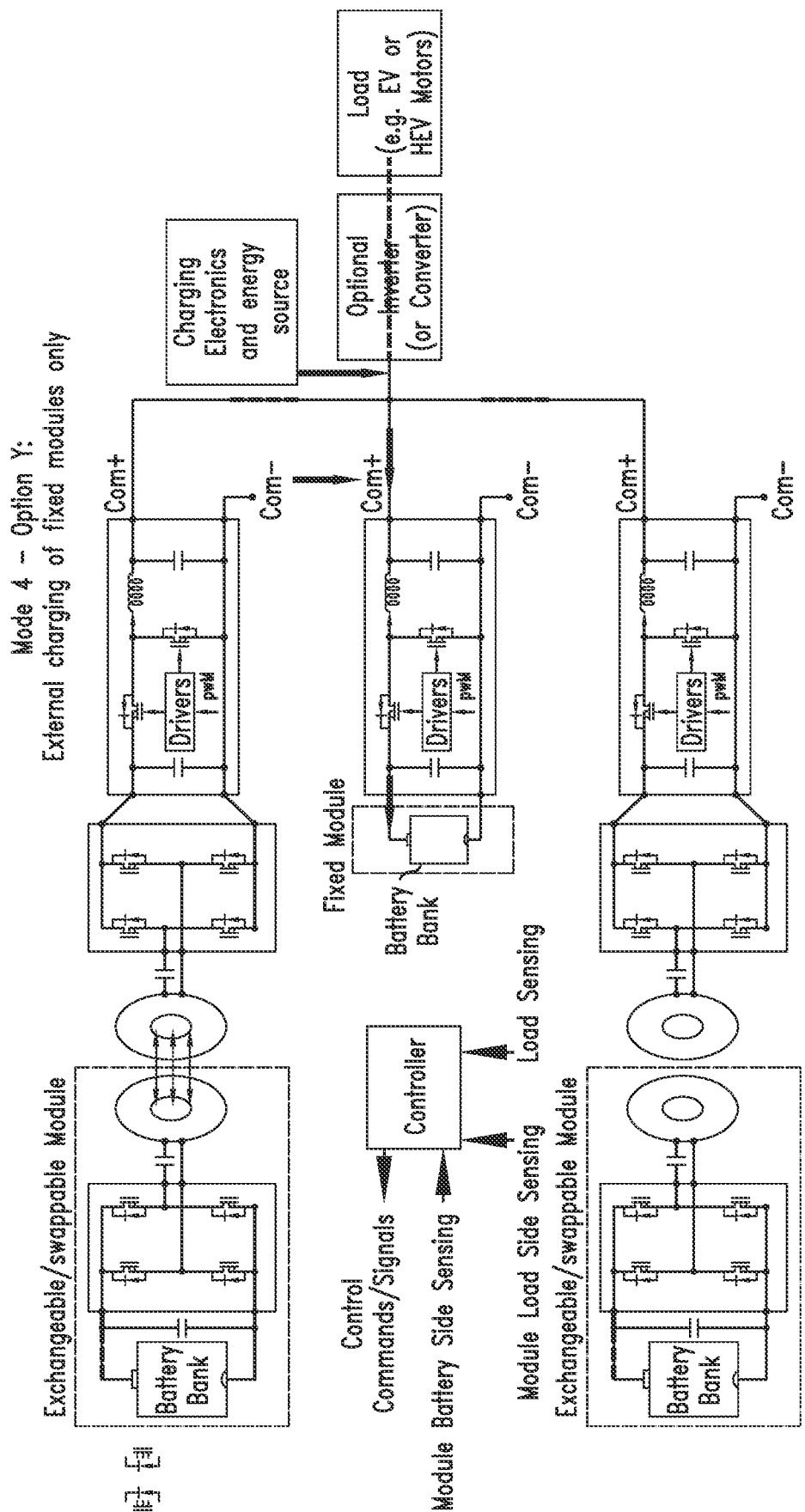
Figure 21:
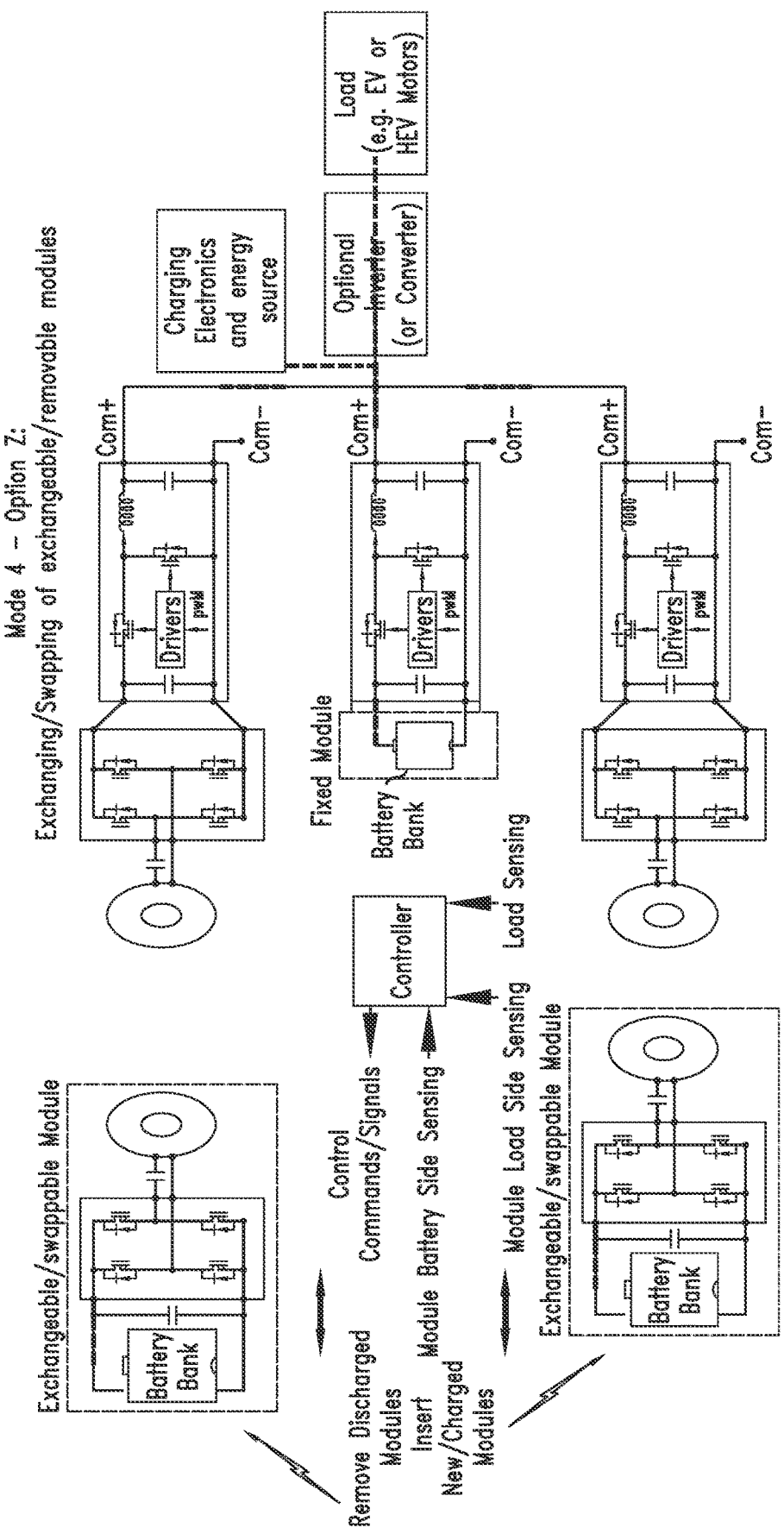

FIG. 15 shows an example energy storage system 100 (shown as 100a) configured with wireless exchangeable energy storage modules 1502 (referred to as 1502a and 1502b).

As shown in FIG. 15, the wireless exchangeable energy storage modules 1502 includes one or more battery packs 1504 that is coupled to a set of inverters 1506 that couples to, and controls, a charge/discharging-through inductive coil 1508. The vehicle power electronics includes a corresponding charge/discharging inductive coil 1510 that is coupled to a corresponding set of inverters 1512 that controls the inductive coupling between the exchangeable energy storage modules 1502 and the vehicle electrical bus 1518. The vehicle system further includes a converter 1514 to convert, and regulate, the output of the inductive coil inverters 1512 to a vehicle bus voltage level maintained at the vehicle bus 1518. The fixed energy storage module 102 (shown as 1516) may be coupled to the bus 1518 through a separate and distinct converter 1520.

FIGS. 16-21 each shows the respective multi-mode operation of FIGS. 2-7 in the example energy storage system of FIG. 15 configured with wireless exchangeable energy storage modules 1502.

Example Vehicle System

Figure 22:
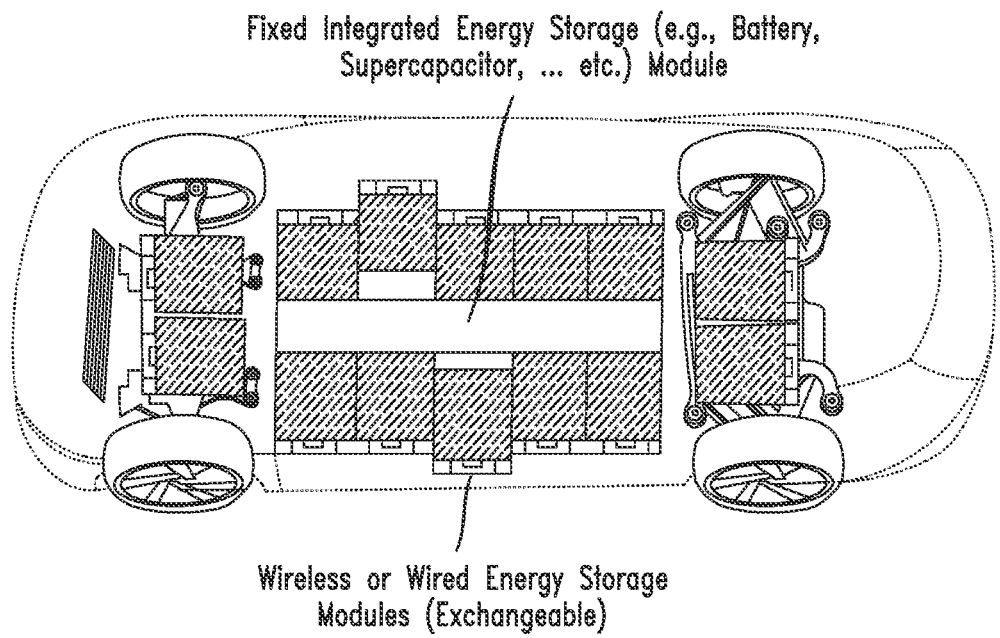
FIGS. 22-23 show an example vehicle system configured with the example energy storage system of FIGS. 1 and 15 in accordance with an illustrative embodiment.
Figure 23:
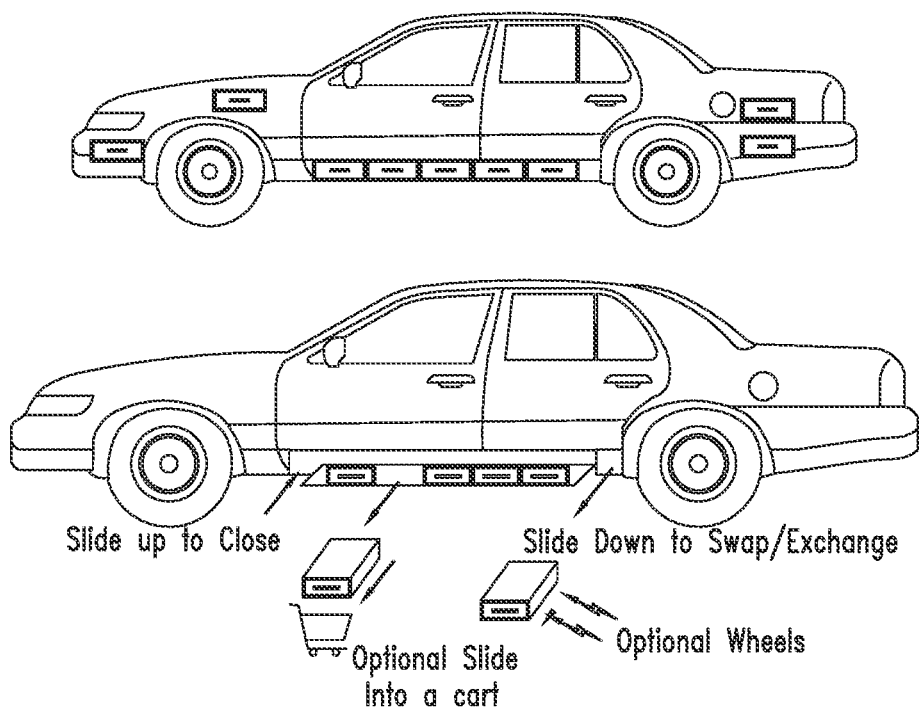

FIGS. 22-23 show an example vehicle system configured with the example energy storage system of FIGS. 1 and 15 in accordance with an illustrative embodiment. In FIG. 22, example compartments and placements of the fixed energy storage module 102 are shown in the center of the vehicle chassis while compartments 2202 for the exchangeable energy storage modules 104 are located for access from the front, rear, and side of the vehicle.

FIG. 23 shows additional compartments for the exchangeable energy storage modules in the front region and rear region of the vehicle.

Figure 24:
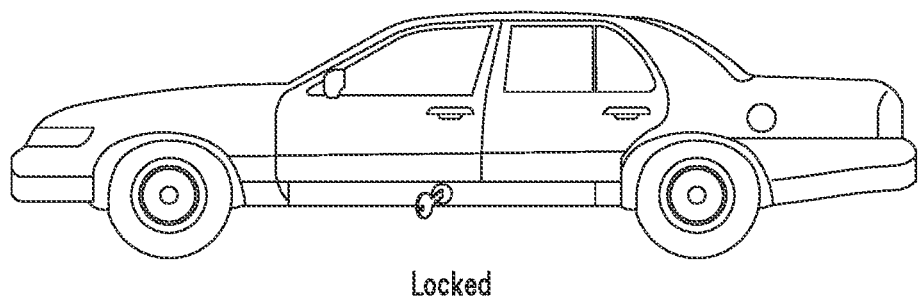
FIG. 24 shows an example vehicle system configured with lockable panel for the exchangeable energy storage modules.
Figure 25:
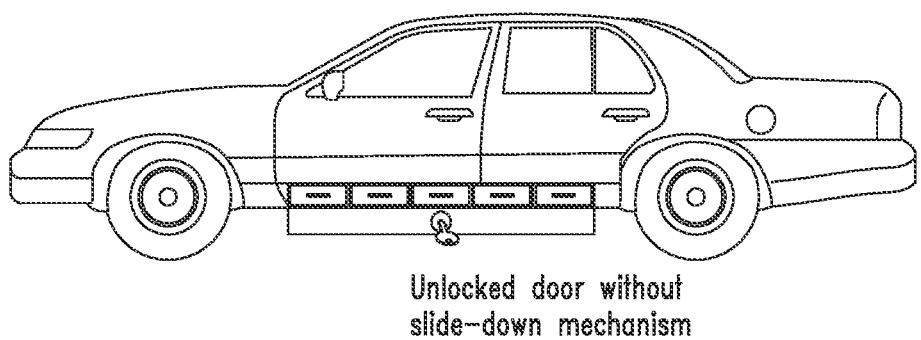
FIG. 25 shows the example vehicle system configured with lockable panel of FIG. 24 with the panel in an unlocked and open position.

FIG. 24 shows an example vehicle system configured with lockable panel for the exchangeable energy storage modules. FIG. 25 shows the same with the panel in an unlocked and open position.

Figure 26:
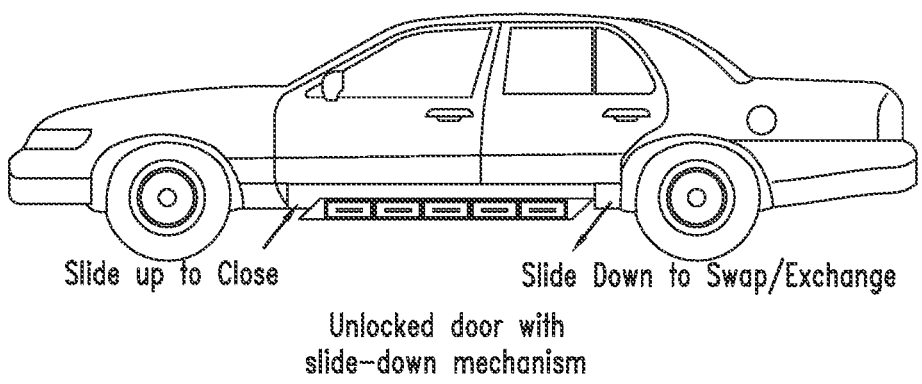
FIG. 26 shows an example vehicle system configured with a hatch bay for the exchangeable energy storage modules.

FIG. 26 shows an example vehicle system configured with a hatch bay for the exchangeable energy storage modules. The hatch bay has a panel that forms a part of bottom carriage or chassis of the vehicle. In some embodiments, the hatch bay is configured to provide a ramp for the exchangeable energy storage modules to be loaded (e.g., by way of rolling) onto the corresponding compartment without lifting.

In FIGS. 22-26, a vehicle is shown having a fixed battery and several exchangeable battery modules that can be accessed from one or more slots under the vehicle (with some optional modules in other locations such as in a trunk) through a door (which can be access protected by a key, keyless remote controller, code, figure print, or any other method) that can slide down for ease of removal and addition of battery modules. These modules can be wireless battery modules.

Example Computing Environment

Figure 27:
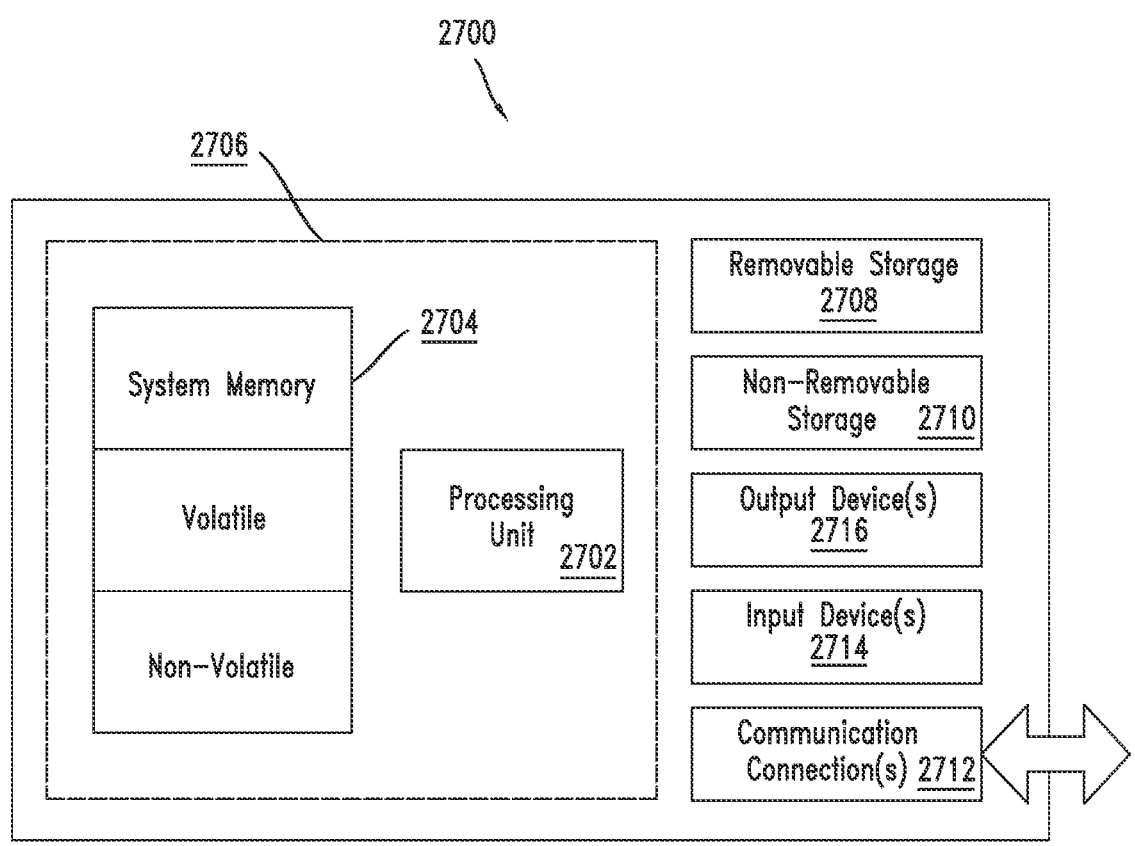
FIG. 27 shows an exemplary computing environment in which example embodiments of the multi-mode controller and aspects thereof may be implemented.

FIG. 27 shows an exemplary computing environment in which example embodiments of the multi-mode controller (e.g. 108) and aspects thereof may be implemented.

The computing device environment is only one example of a suitable computing environment and is not intended to suggest any limitation as to the scope of use or functionality.

Numerous other general-purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 27, an exemplary system for implementing aspects described herein includes a computing device, such as computing device 2700. In its most basic configuration, computing device 2700 typically includes at least one processing unit 2702 and memory 2704. Depending on the exact configuration and type of computing device, memory 2704 may be volatile (such as random-access memory (RAM)), non-volatile (such as read-only memory (ROM), flash memory, etc.), or some combination of the two. This most basic configuration is illustrated in FIG. 27 by dashed line 2706.

Computing device 2700 may have additional features/functionality. For example, computing device 2700 may include additional storage (removable and/or non-removable) including, but not limited to, magnetic or optical disks or tape. Such additional storage is illustrated in FIG. 27 by removable storage 2708 and non-removable storage 2710.

Computing device 2700 typically includes a variety of computer readable media. Computer readable media can be any available media that can be accessed by the device 2700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 2704, removable storage 2708, and non-removable storage 2710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 2700. Any such computer storage media may be part of computing device 2700.

Computing device 2700 may contain communication connection(s) 2712 that allow the device to communicate with other devices. Computing device 2700 may also have input device(s) 2714 such as a keyboard, mouse, pen, voice input device, touch input device, etc. Output device(s) 2716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Graphical Processing Units (GPUs), Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASIC s), Application-specific Standard Products (ASSPs), System-on-a-chip systems (SOC s), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, and wearable devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Having thus described several embodiments of the claimed invention, it will be rather apparent to those skilled in the art that the foregoing detailed disclosure is intended to be presented by way of example only, and is not limiting. Many advantages for non-invasive method and system for location of an abnormality in a heart have been discussed herein. Various alterations, improvements, and modifications will occur and are intended to those skilled in the art, though not expressly stated herein. Any alterations, improvements, and modifications are intended to be suggested hereby, and are within the spirit and the scope of the claimed invention. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:

1. An energy storage system of an electric vehicle or hybrid electric vehicle, comprising:
   a fixed energy storage module configured to provide power to at least a drive system comprising one or more electrical motors or other type of one or more loads, wherein the fixed energy storage module is sized in power output to solely and independently drive at least the drive system;

a set of exchangeable energy storage modules configured to provide power to at least the drive system, wherein the set of exchangeable energy storage modules is sized in power output to solely and independently drive at least the drive system; and a multi-mode controller, the multi-mode controller having a processor and memory having instructions stored thereon, including:

a first instruction to control a first energy flow direction, a first energy flow amount, and a first energy flow rate from at least one exchangeable energy storage module of the set of exchangeable energy storage modules to the drive system in a first mode;

a second instruction to determine when the at least one exchangeable energy storage module has a discharge rate corresponding to a maximum allowable discharge rate for the at least one exchangeable energy storage module when directing energy flow to the drive system;

a third instruction to determine available power associated with the energy flow of the at least one exchangeable energy storage module as the at least one exchangeable energy storage module directs energy flow to the drive system;

a fourth instruction to control a second energy flow direction, a second energy flow amount, and a second energy flow rate from the fixed energy storage module to the drive system in a second mode based on the determination that the at least one exchangeable energy storage module has a discharge rate corresponding to a maximum allowable discharge rate for the at least one exchangeable energy storage module; and a fifth instruction to control a third energy flow direction, a third energy flow amount, and a third energy flow rate from the at least one exchangeable energy storage to the fixed energy storage module in a third mode based on the determined available power associated with the energy flow of the at least one exchangeable energy storage.

2. The energy storage system of claim 1, wherein the vehicle comprises:

a fixed energy storage module bay, the fixed energy storage module bay being configured to fixably retain the fixed energy storage module; and a plurality of exchangeable energy storage module bays, each of the plurality of exchangeable energy storage module bays being configured to receive a given exchangeable energy storage module and to adjust between a retaining state and a release state for the given exchangeable energy storage module.

3. The energy storage system of claim 2, wherein each of plurality of exchangeable energy storage module bays is configured with a quick-disconnect wire connector to electrically connect to energy storage device and electronics of the given exchangeable energy storage module.

4. The energy storage system of claim 2, wherein each of plurality of exchangeable energy storage module bays is configured with a quick insertion and removal to wirelessly connect via wireless power transfer to energy storage device and electronics of the given exchangeable energy storage module.

5. The energy storage system of claim 2, wherein the fixed energy storage module bay is configured with a quick-disconnect wire connector to electrically connect to energy storage device and electronics of the fixed energy storage module.

6. The energy storage system of claim 2, wherein the fixed energy storage module bay is configured with a quick insertion and removal to wirelessly connect via wireless power transfer to batteries and electronics of the fixed energy storage module.

7. The energy storage system of claim 2, wherein the fixed energy storage module comprises a set of sub-modules, each sub-module being housed in a distinct housing to be received in sub-bays located in the fixed energy storage module bay.

8. The energy storage system of claim 1, wherein the set of exchangeable energy storage modules has a number of modules selected from the group consisting of 1, 2, 4, 5, 6, 7, 8, 9, 10, 11, 12, 13, 14, and 15.

9. The energy storage system of claim 1, wherein instructions further include:

a sixth instruction to determine whether the energy storage system is electrically or wirelessly connected to a power source; and a seventh instruction to direct charging and discharging of the fixed energy storage module and the set of exchangeable energy storage modules based on the determination.

10. The energy storage system of claim 1, the instructions further includes:

an eighth instruction to determine one or more charge-while-drive parameters selected from the group consisting of:

a maximum power, current, or voltage parameter that each exchangeable energy storage module can be discharged at;

a maximum power, current, or voltage parameter that each fixed energy storage module can be discharged at;

a maximum power, current, or voltage parameter that each fixed energy storage module can be charged at;

a maximum power, current, or voltage parameter that each exchangeable energy storage module can be charged at;

an efficiency parameter associated with an energy transfer between the at least one exchangeable energy storage module or the fixed energy storage module;

a temperature parameter associated with the at least one exchangeable energy storage module or the fixed energy storage module;

a state of charge parameter associated with the at least one exchangeable energy storage module or the fixed energy storage module;

a state of health parameter associated with the at least one exchangeable energy storage module or the fixed energy storage module;

a user selection of a charge-while-drive configuration; and a ninth instruction to adjust the second energy flow direction, the second energy flow amount or the second rate of energy flow from the at least one exchangeable energy storage to the fixed energy storage module based on the determined one or more charge-while-drive parameters.

11. The energy storage system of claim 1, wherein each exchangeable energy storage module of the set of exchangeable energy storage modules has a weight that allows for ease of removal an insertion without the need for specialized tools or equipment.

12. An electric vehicle or hybrid-electric vehicle comprising:
one or more electrical motors;
a drive system coupled to the one or more electrical motors;
a set of one or more fixed energy storage modules each configured to provide power to at least the drive system, wherein the set of one or more fixed energy storage modules collectively is sized in power output to solely and independently drive at least the drive system;
a set of one or more exchangeable energy storage module bays, each bay of the one or more exchangeable energy storage module bays being configured to receive an exchangeable energy storage module configured to provide power to at least the drive system, wherein a set of exchangeable energy storage modules when placed in the set of one or more exchangeable energy storage module bays is configured in power output to solely and independently drive at least the drive system; and
a multi-mode controller, the multi-mode controller having a processor and memory having instructions stored thereon, including:
a first instruction to control a first energy flow direction, a first energy flow amount, and a first energy flow rate from at least one exchangeable energy storage module of the set of two or more exchangeable energy storage modules to the drive system in a first mode;
a second instruction to determine when the at least one exchangeable energy storage module has a discharge rate corresponding to a maximum allowable discharge rate for the at least one exchangeable energy storage module when directing energy flow to the drive system;
a third instruction to determine available power associated with the energy flow of the at least one exchangeable energy storage module as the at least one exchangeable energy storage module directs energy flow to the drive system;
a fourth instruction to control a second energy flow direction, a second energy flow amount, and a second energy flow rate from the fixed energy storage module to the drive system in a second mode based on the determination that the at least one exchangeable energy storage module has a discharge rate corresponding to a maximum allowable discharge rate for the at least one exchangeable energy storage module; and
a fifth instruction to control a third energy flow direction, a third energy flow amount, and a third energy energy flow rate from the at least one exchangeable energy storage to the fixed energy storage module in a third mode based on the determined available power associated with the energy flow of the at least one exchangeable energy storage.

13. The electric vehicle or hybrid-electric vehicle of claim 12, wherein each bay of the set of one or more exchangeable energy storage module bays comprises a hatch to an internal compartment to retain an exchangeable energy storage module.

14. The electric vehicle or hybrid-electric vehicle of claim 13, wherein each bay of the set of one or more exchangeable energy storage module bays is configured to adjust between a retaining state and a release state for the exchangeable energy storage module.

15. The electric vehicle or hybrid-electric vehicle of claim 12, comprising:
a fixed energy storage module bay, the fixed energy storage module bay being configured to fixably retain the fixed energy storage module.

16. The electric vehicle or hybrid-electric vehicle of claim 12, wherein each of the set of one or more of exchangeable energy storage module bays is configured with a quick-disconnect wire connector to electrically connect to energy storage device and electronics of the given exchangeable energy storage module.

17. The electric vehicle or hybrid-electric vehicle of claim 12, wherein each of the set of one or more exchangeable energy storage module bays is configured with a quick insertion and removal to wirelessly connect via wireless power transfer to energy storage device and electronics of the given exchangeable energy storage module.

18. The electric vehicle or hybrid-electric vehicle of claim 12, comprising:
a charging port, the multi-mode controller being configured to determine when the charging port is connected to a charging system and to direct charging of the set of one more fixed energy storage modules and the set of one or more exchangeable energy storage modules based on the determination.

* * * * *

UNITED STATES PATENT AND TRADEMARK OFFICE
CERTIFICATE OF CORRECTION

PATENT NO. : 11,628,731 B2
APPLICATION NO. : 17/075077
DATED : April 18, 2023
INVENTOR(S) : Jaber A. Abu Qahouq et al.

It is certified that error appears in the above-identified patent and that said Letters Patent is hereby corrected as shown below:

In the Claims

Claim 10, Column 18, Line 58, reading:
direction, the second energy flow amount or the second Should read:
direction, the second energy flow amount, or the second Claim 12, Column 20, Lines 5-6, reading:
-tion, a third energy flow amount, and a third energy energy flow rate from the at least one exchangeable Should read:
-tion, a third energy flow amount, and a third energy flow rate from the at least one exchangeable Signed and Sealed this
Eleventh Day of July, 2023

Katherine Kelly Vidal
*Director of the United States Patent and Trademark Office*